(12) United States Patent
Ferreira

(10) Patent No.: US 8,672,686 B2
(45) Date of Patent: Mar. 18, 2014

(54) METHODS, MEDIA, AND SYSTEMS FOR COMPUTER-BASED LEARNING

(75) Inventor: Jose Ferreira, New York, NY (US)

(73) Assignee: Knewton, Inc., New York, NY (US)

( * ) Notice: Subject to any disclaimer, the term of this patent is extended or adjusted under 35 U.S.C. 154(b) by 929 days.

(21) Appl. No.: 12/192,112

(22) Filed: Aug. 14, 2008

(65) Prior Publication Data

US 2009/0047648 A1 Feb. 19, 2009

Related U.S. Application Data

(60) Provisional application No. 60/955,805, filed on Aug. 14, 2007.

(51) Int. Cl.
*G09B 3/00* (2006.01)

(52) U.S. Cl.
USPC ............ 434/323; 434/322; 434/350; 434/365

(58) Field of Classification Search
USPC ................................ 434/350, 322, 323, 336
See application file for complete search history.

(56) References Cited

U.S. PATENT DOCUMENTS

| | | | |
|---|---|---|---|
| 5,727,951 A | 3/1998 | Ho et al. | |
| 5,743,743 A | 4/1998 | Ho et al. | |
| 5,743,746 A | 4/1998 | Ho et al. | |
| 5,779,486 A | 7/1998 | Ho et al. | |
| 5,863,208 A | 1/1999 | Ho et al. | |
| 5,934,909 A | 8/1999 | Ho et al. | |
| 5,967,793 A | 10/1999 | Ho et al. | |
| 6,029,043 A | 2/2000 | Ho et al. | |
| 6,112,049 A * | 8/2000 | Sonnenfeld ................... 434/350 |
| 6,118,973 A | 9/2000 | Ho et al. | |
| 6,120,300 A | 9/2000 | Ho et al. | |
| 6,126,448 A | 10/2000 | Ho et al. | |
| 6,139,330 A | 10/2000 | Ho et al. | |
| 6,212,358 B1 | 4/2001 | Ho et al. | |
| 6,213,780 B1 | 4/2001 | Ho et al. | |
| 6,325,632 B1 | 12/2001 | Chao et al. | |
| 6,398,556 B1 | 6/2002 | Ho et al. | |
| RE38,432 E | 2/2004 | Fai et al. | |
| 6,685,478 B2 | 2/2004 | Ho et al. | |
| 6,688,888 B1 | 2/2004 | Ho et al. | |
| 6,988,138 B1 | 1/2006 | Alcorn et al. | |

(Continued)

FOREIGN PATENT DOCUMENTS

WO    WO/01/04862    1/2001

OTHER PUBLICATIONS

International Preliminary Report on Patentability dated Feb. 25, 2010 in International Patent Application No. PCT/US2008/073221.

(Continued)

*Primary Examiner* — Xuan Thai
*Assistant Examiner* — Banafsheh Hadizonooz
(74) *Attorney, Agent, or Firm* — Byrne Poh LLP

(57) ABSTRACT

Methods, systems, and media for computer-based learning are provided. In some embodiments, methods for leaching a student in a computer-based learning environment are provided, the methods comprising: identifying a concept to be taught to the student; accessing a learning profile for the student, wherein the learning profile identifies at least one category of content as being more successful than other categories in teaching the student; selecting content based on the student learning profile, the concept to be taught, and a categorization of the content; and presenting the content to the student.

39 Claims, 21 Drawing Sheets

(56) References Cited

U.S. PATENT DOCUMENTS

| | | |
|---|---|---|
| 7,050,753 B2 * | 5/2006 | Knutson .................... 434/350 |
| 7,153,140 B2 | 12/2006 | Berman et al. |
| 7,201,580 B2 | 4/2007 | Ho et al. |
| RE39,942 E | 12/2007 | Fai et al. |
| 2001/0055749 A1 | 12/2001 | Siefert |
| 2007/0050445 A1 | 3/2007 | Hyndman |
| 2008/0131863 A1 * | 6/2008 | Stuppy .................... 434/362 |
| 2009/0186329 A1 * | 7/2009 | Connor .................... 434/350 |

OTHER PUBLICATIONS

Written Opinion and International Search Report dated Nov. 12, 2008 in International Patent Application No. PCT/US2008/073221.

Office Action dated Apr. 25, 2013 in Japanese Patent Application No. 2010-521189.

\* cited by examiner

METHODS, MEDIA, AND SYSTEMS FOR COMPUTER-BASED LEARNING

CROSS REFERENCE TO RELATED APPLICATION

This application claims the benefit of U.S. Provisional Patent Application No. 60/955,805, filed Aug. 14, 2007, which is hereby incorporated by reference herein in its entirety.

TECHNICAL FIELD

The disclosed subject matter relates to methods, systems, and media for computer-based learning.

BACKGROUND

With the wide spread availability of computer systems and Internet access around the world, and the need for flexibility in the usage of one's time for learning new things, computer-based learning has rapidly grown in popularity in recent years. Such computer-learning systems can be stand-alone systems that operate on a single device, or can be Internet-based systems that operate in a client-server architecture.

Much room for improvement exists in the quality of teaching provided by prior computer-based learning systems. Accordingly, in accordance with various embodiments, methods, systems, and media for computer-based learning are provided.

SUMMARY

Methods, systems, and media for computer-based learning are provided. In some embodiments, methods for teaching a student in a computer-based learning environment are provided, the methods comprising: identifying a concept to be taught to the student; accessing a learning profile for the student, wherein the learning profile identifies at least one category of content as being more successful than other categories in teaching the student; selecting content based on the student learning profile, the concept to be taught, and a categorization of the content; and presenting the content to the student.

In some embodiments, computer-readable media containing computer-executable instructions that, when executed by a processor, cause the processor to perform a method for teaching a student in a computer-based learning environment are provided, the method comprising: identifying a concept to be taught to the student; accessing a learning profile for the student, wherein the learning profile identifies at least one category of content as being more successful than other categories in teaching the student; selecting content based on the student learning profile, the concept to be taught, and a categorization of the content; and presenting the content to the student.

In some embodiments, systems for teaching a student in a computer-based learning environment are provided, the systems comprising: a processor that: identifies a concept to be taught to the student; accesses a learning profile for the student, wherein the learning profile identifies at least one category of content as being more successful than other categories in teaching the student; selects content based on the student learning profile, the concept to be taught, and a categorization of the content; and presents the content to the student.

DETAILED DESCRIPTION

In accordance with various embodiments, as described in more detail below, mechanisms for computer-based learning are provided.

Figure 1:
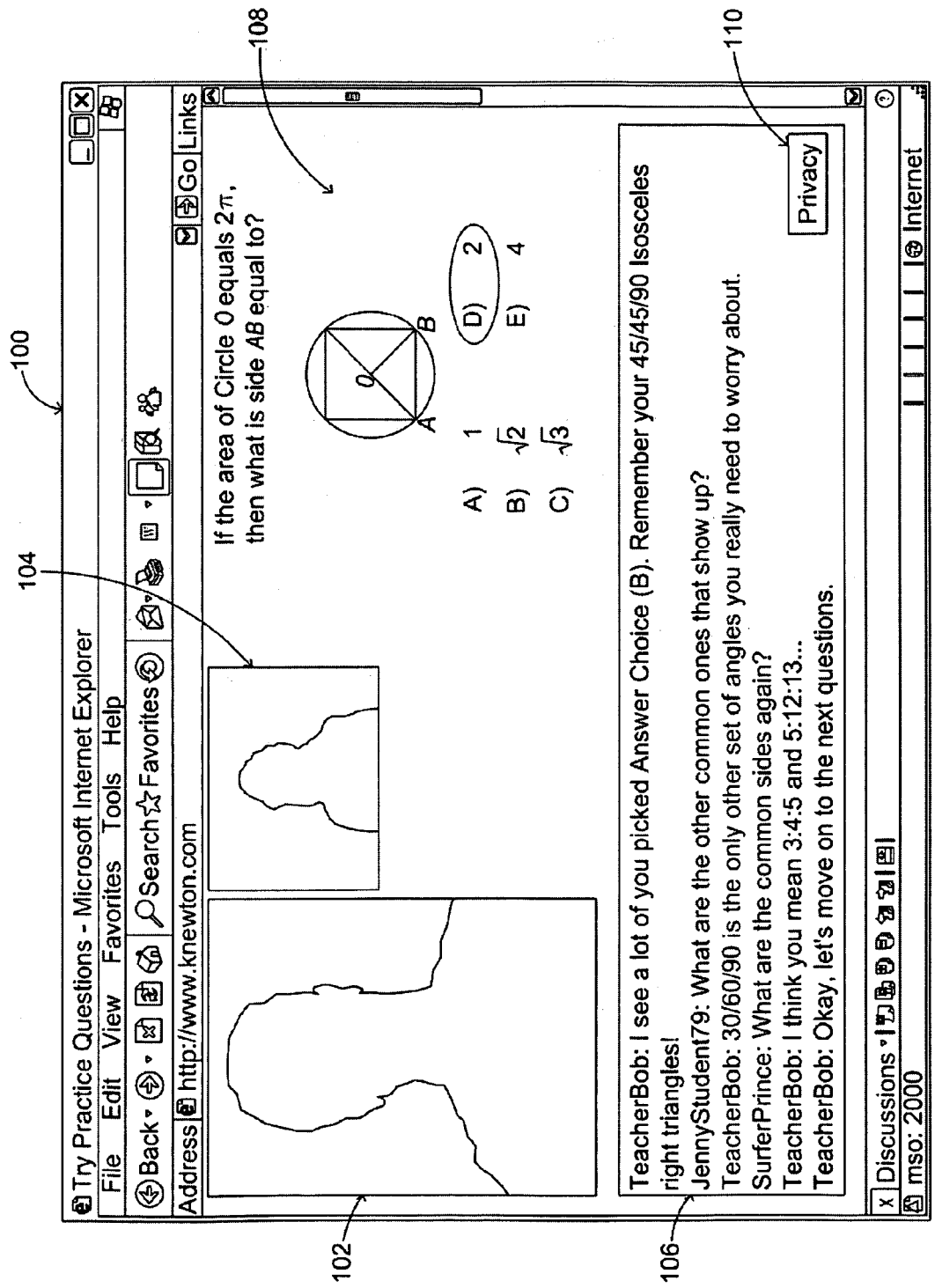
FIG. 1 is a diagram of a teaching user interface in accordance with some embodiments.

Turning to FIG. 1, an example of a teaching interface 100 in accordance with some embodiments is illustrated. As shown, interface 100 can include one or more video regions 102 and 104, a text chat window 106, and a white board space 108. The video regions can contain still images of class participants (such as a teacher, a student, etc.), live video of class participants, or any other suitable image(s) and/or video content. By providing live video, students may be pressured into attending class regularly and on time. This live video can also be recorded and played back at a later time to help students make up missed classes, and/or review previously taken classes.

The text chat window can be used to conduct a chat session between a teacher, a teaching assistant, and/or one or more students. As shown, a "Privacy" button 110 can be provided in the chat window to prevent a student's question and a corresponding answer, and/or student's identity, from being displayed to other class participants (e.g., such as other students). To enable a teacher and/or teaching assistant to rapidly respond to questions, in some embodiments, pre-formatted answers to common questions may be provided to the teacher and/or teaching assistant so that he or she can drag and drop the pre-formatted answers into the chat.

The white board space can be used to provide visual teaching content, such as text (in hand written or typed format), images (pictures, clip art, diagrams, charts, graphs, tables, hand sketched drawings, etc.), and/or any other suitable content. The teacher can write on the whiteboard, like a "telestrator" on TV. The teacher can substitute out practice questions from the pre-built lesson and substitute in other questions that are either easier or more difficult, as the class' performance warrants.

Although not shown in the illustrative interface in FIG. 1, in some embodiments, the teacher can also conduct instant polling via a teaching interface. For example, a poll question and one or more spaces for responses (such as a data entry field and/or radio buttons (e.g., for true/false or multiple-choice questions)) can be provided in the white board space of interface 100 in some embodiments.

Figure 2:
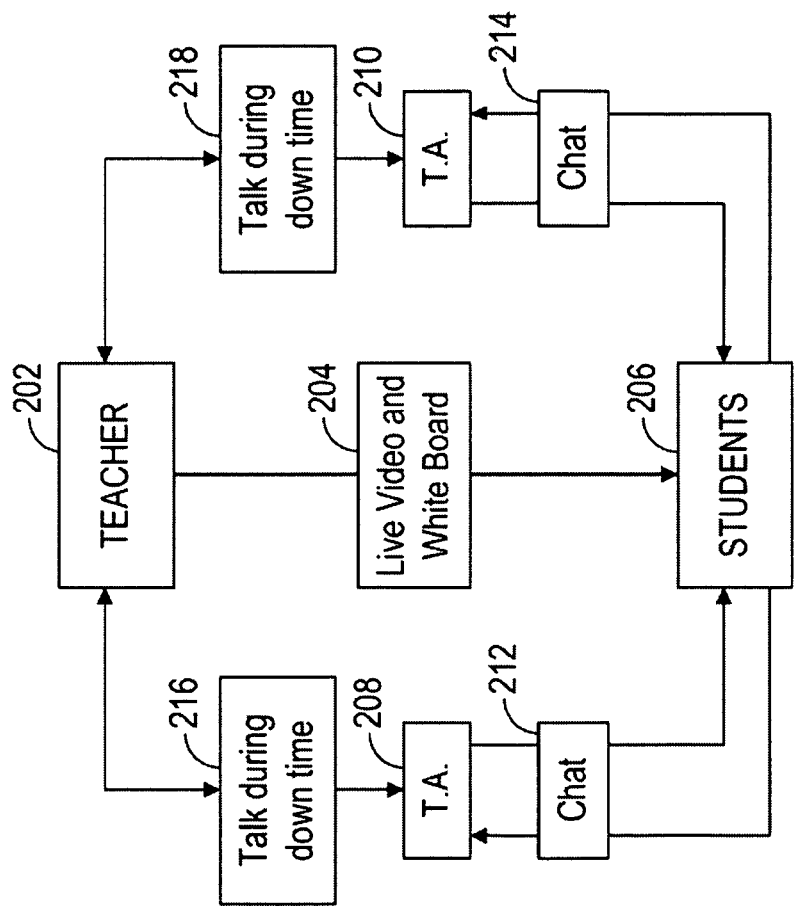
FIG. 2 is a diagram of communication flow in accordance with some embodiments.

FIG. 2 illustrates an example of communication activity that can take place during a class session in accordance with some embodiments. As shown, a teacher 202 can teach a class by delivering live video and white board instruction 204 to students 206. One or more teaching assistants 208 and 210 can conduct chat sessions 212 and 214 with students to assist them in understanding the teacher's lesson. During down time (e.g., when the students are either reading passages or doing practice questions), the teacher can talk (e.g., via a chat window) at 216 and 218 with one or more of the teaching assistants to better understand what types of questions the students are asking. The teacher can then use this information to make comments to the students via the live video like: "I see many of you are having trouble with Question #2," or "Choice B was a very tempting wrong answer choice for many of you," or "Let's go back and cover that concept again because I see a lot of you are asking questions about it," and so on.

In some embodiments, students can be evaluated using any suitable sources of information on the students. For example, a student can be evaluated using practice questions, quizzes, tests, instant polling, and information from teaching assistants (who may be conducting chat sessions with the student, for example). In some embodiments, based on these evaluations, a syllabus of learning content (such as classes, lessons, homework assignments, tests, quizzes, study aids, etc.) that is delivered to a student can be tailored to the knowledge level of that student.

For example, skills-only quizzes that measure whether a given student has mastered a given concept at a given difficulty level can be given. These quizzes can include questions that test exactly one topic each (a typical SAT/GMAT question contains more than one topic). In some embodiments, the answers to these questions can be numbers or words that must be keyed in with a keyboard (as opposed to multiple choice). This reduces the element of students guessing the right answer through luck and confusing the system. True/False questions, which can also be used, are also an excellent question type for skills assessment, especially for non-quantitative topics. While guessing is easy in True/False, the questions are so short and quick to answer that the same amount of quiz time can yield more information.

Based on such quizzes, both explanatory learning content (e.g., text, video, etc.) and follow-up skills quizzes can be assembled. This dynamically assembled content can be unique to, and tailored for, each student. For example, a student having trouble with a particular concept can be given more learning content on that concept, and then more practice questions. Once the concept has been mastered on easy difficulty questions, the student can be given medium difficulty questions, then high difficulty questions, etc. Once the concept has been mastered, the concept can be removed from the student's daily syllabi, except, perhaps, for an occasional review question for retention. In this way, an "Adaptive Learning" experience can be provided.

Any suitable mechanism or logic can be used to determine what content and/or follow-up quizzes are delivered based on previous evaluations or assessments in accordance with some embodiments. For example, pre-coded algorithms (which can be updated as necessary) can be generated by subject-matter experts who produce a given course and/or teachers of a given course. Such algorithms can specify, for example, what prerequisites (such as completed classes or assignments, quiz scores, etc.) need to be achieved before a student can receive corresponding learning content. In this way, such algorithms can control the flow of learning content to a student, and dictate the milestones that must be achieved for the student to progress down that flow.

As another example, strategies used by other students can also be used to determine what content and/or follow-up quizzes are delivered based on previous evaluations or assessments. For example, if one strategy (or format) of teaching (e.g., such as delivering video content, or providing a large number of drill questions) was particularly successful in teaching a large number of students (or a student with similar traits to a present student), that same strategy may yield better results in teaching the present student than other strategies. For a given conceptual failure by a student, strategies used to successfully teach past students who had that same conceptual roadblock can be evaluated to determine what next steps were most effective at getting those students past the conceptual roadblock. The present student can then be assigned the most-successful path forward. As strategies increase in the number of times they prove to be successful, the likelihood of that strategy being selected for a present student can then be increased.

In some embodiments, reports on student performance can be provided. These reports may be provided at regular intervals and/or as the need arises (such as when a student is falling behind other students). Reports can be provided to any suitable interested party, such as the student, the student's parent(s) and/or guardian(s), school (e.g., teacher, principal, etc.), employer, etc. These reports can be delivered using any suitable mechanism such as email, text message, facsimile, Web page, instant message, mail, etc.

In some embodiments, reports can include any suitable information. For example, reports can include information on the activity of a student, the effort of a student, the improvement of a student, the grades (e.g., on quizzes, etc.) of a student, the mastery level of a student, etc. For example, activity information can include how much time a student spent in using the learning system. As another example, effort information can include how much time was spent reading or watching any given content, how much time was spent on given practice questions, etc. As yet another example, improvement information can include how fast the student is mastering concepts and increasing in difficulty level. As a further example, grades information can include information on major tests, daily quizzes, etc. As another further example, mastery information can include a student's current mastery level of any given curriculum—e.g. a student is getting 80% of test questions on a corresponding concept correct.

In some embodiments, reports for a test preparation course (e.g., a course to prepare a student to take the SAT, LSAT, GRE, etc. test) can include a prediction of the score that a student may get if the student were to take the test at the time of the report.

Reports can provide three kinds of information: absolute; relative; and judgmental, in some embodiments. For example, reports can report absolute, objective data on what scores a student is getting on tests, quizzes, etc. As another example, reports can additionally or alternatively give relative, objective data on how that student compares to other students studying the same material. As yet another example, reports can additionally or alternatively give "subjective" judgments, such as: "Stop goofing around! You're logged into the system for hours at a time but hardly doing any work."; "Work smart to get smart: you're making the same mistakes over and over! Carefully study the explanation every time you make a mistake. If you don't learn from (your own) history, you're doomed to repeat it!"; and "You're really stuck on the concept of negative exponents. And e-mail alert is being sent to your teacher as you read this, so that you can get some tutoring right away on this intuitive roadblock. Don't worry—Help is on the way!" Such subjective judgments can be generated based on any suitable data, such as time spent on the system, amount of work done, repetition of wrong answers to questions, and a high number of wrong answers to questions on the same concept.

Figure 3:
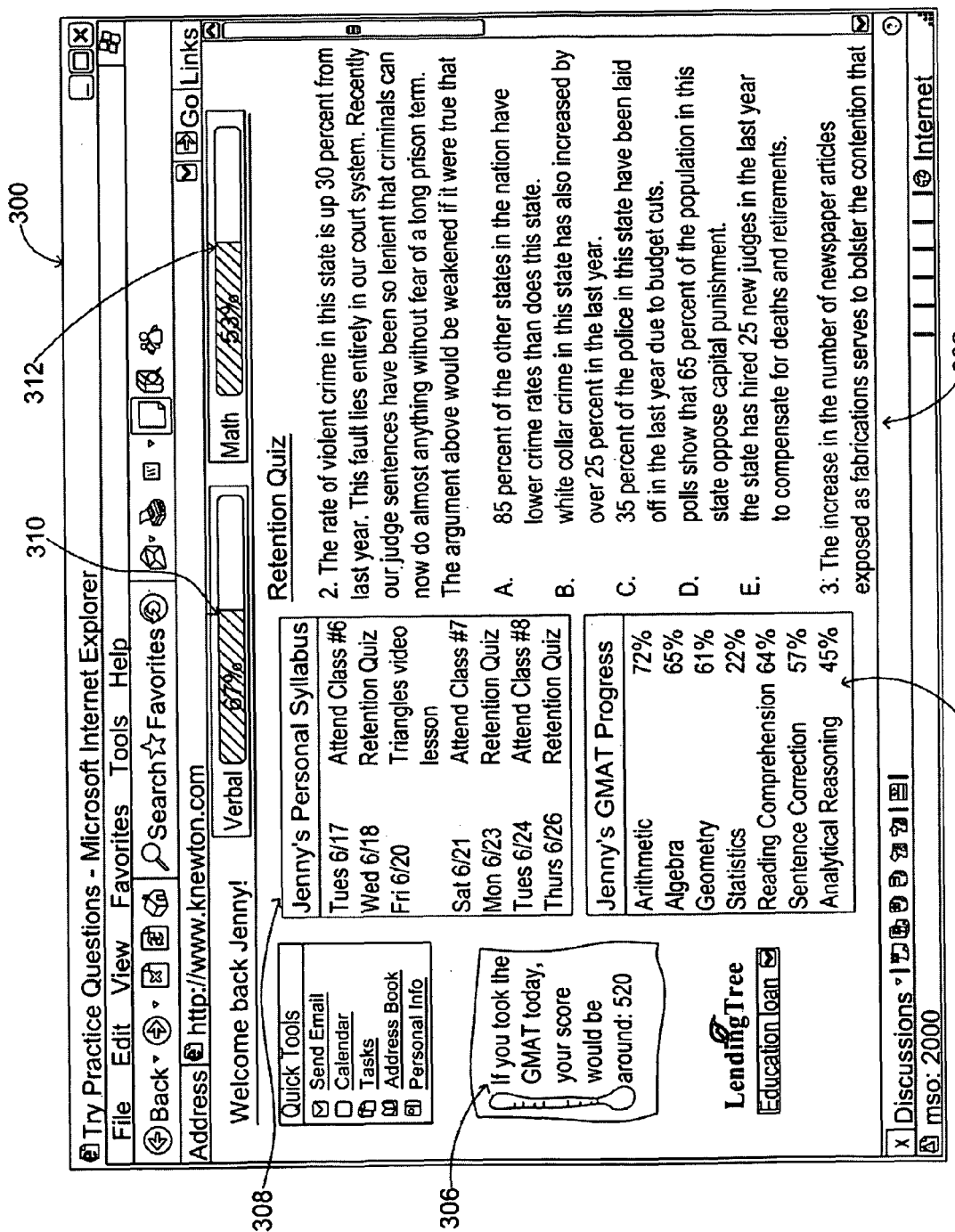
FIG. 3 is a diagram of a study user interface in accordance with some embodiments.
Figure 19:
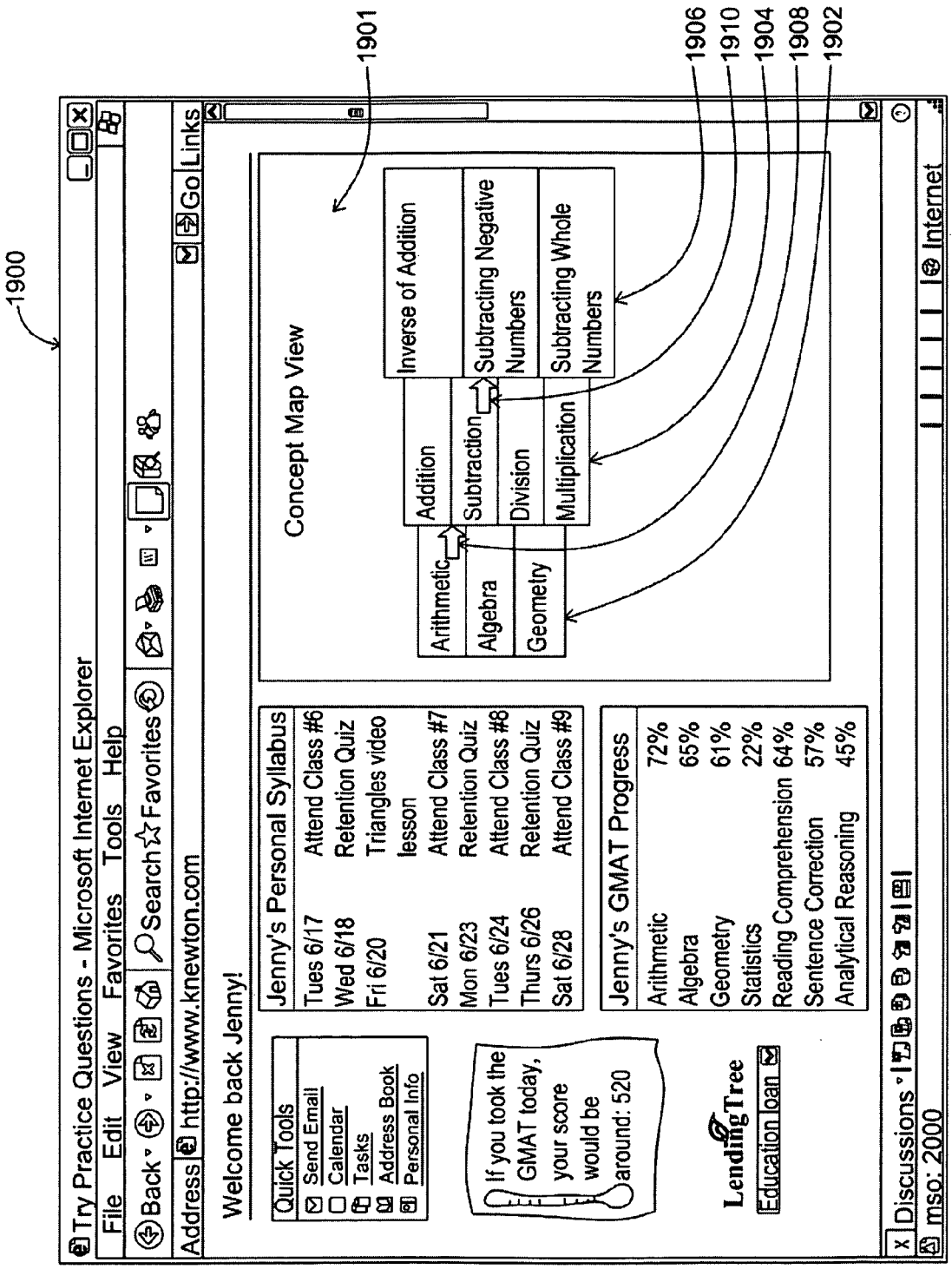
FIG. 19 is a diagram of an interface for a concept map view in accordance with some embodiments.

An example of a user interface 300 illustrating examples of a quiz 302, a progress report 304, a prediction report 306, a syllabus 308, and progress bars 310 and 312 is shown in FIG. 3. Quiz 302 can be any suitable quiz and can be of any suitable format. For example, quiz 302 can be a retention quiz that includes multiple-choice questions. Progress report 304 can be used to display any suitable progress information for a student. For example, a progress report can be used to show a student's percentage of questions answered correctly in a variety of GMAT subjects (e.g., arithmetic, algebra, geometry, statistics, reading comprehension, sentence correction, analytical reasoning, etc.). Prediction report 306 can be used to show what score a student might receive if it were to take a test being prepared for on the day of the report. For example, as shown, if the student were to take the GMAT examination today, the student's score would be around 520. Syllabus 308 can be used to show learning activities that have been assigned to the student. For example, the syllabus may indicate that the student has been assigned to take class #6, a retention quiz, a triangles video lesson, etc. In some embodiments, syllabus 308 can be presented as a calendar, or portion of a calendar. Progress bars 310 and 312 can be used to reflect the student's level of mastery as determined by content consumed and assessments administered. While the progress bar can be shown for a whole syllabus, it can also be shown for courses, lessons, concepts, content, or any other suitable combination of knowledge. Content may be accessed by clicking on the progress bar. Alternatively, clicking on the progress bar may cause a concept map view including the related concept to be presented as described below in connection with FIG. 19.

Figure 4:
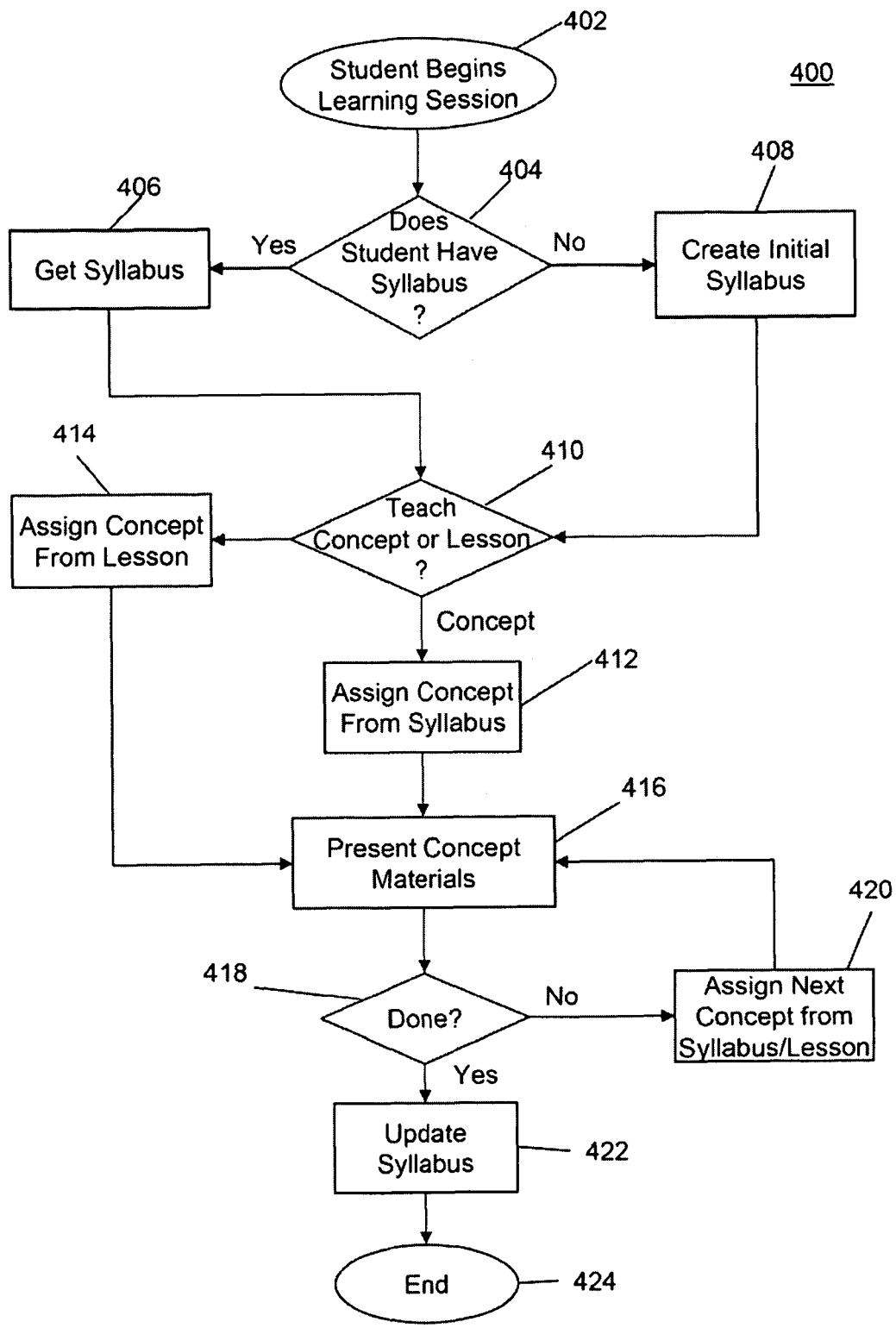
FIG. 4 is a diagram of a learning session process in accordance with some embodiments.

Turning to FIGS. 4-11, examples of processes that can be used to control the presentation of learning content to a student in some embodiments are illustrated. More particularly, FIG. 4 shows a general process 400 for a learning session that can be used in some embodiments. After process 400 begins at 402, the process determines if the student has a syllabus. This determination can be made in any suitable fashion such as by checking a database of syllabuses for a syllabus associated with the student. If it is determined that a syllabus does exist, then the processes gets the syllabus at 406. Otherwise a syllabus is created at 408.

Figure 5:
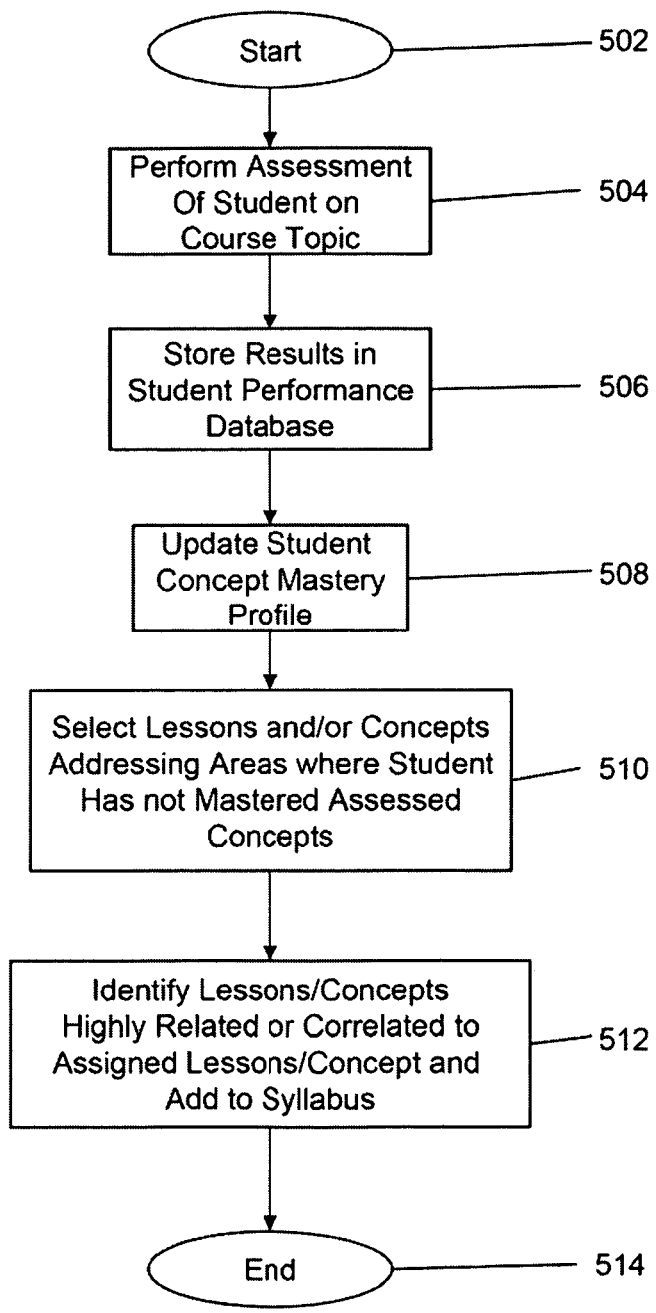
FIG. 5 is a diagram of a process for creating a syllabus in accordance with some embodiments.

The creation of a syllabus at 408 can be performed in some embodiments as shown in process 500 of FIG. 5, although any other suitable process for creating a syllabus can additionally or alternatively be used. As shown in process 500, after the process begins at 502, an assessment of a student on a course topic can be performed at 504. The assessment can include a sample test which can be administered under test-like conditions. Additionally or alternatively, the assessment can include questions designed to test very few concepts. The assessment can include True/False questions, which, while subject to guessing, yield a large number of data points in a short period of time. These data points may present a pattern which reveals a student's areas of strength and weakness. The assessment can include questions that require the student to generate a response. Such questions lower the possibility of guessing. The assessment can be focused on a limited number of concepts that appear early in the course. This may allow the system to generate a more accurate starting point for the student's syllabus than would be possible with an assessment that consists of questions that test many concepts. This may also allow the system to generate a student's profile on concepts that will be taught and assessed immediately in the course.

Figure 6:
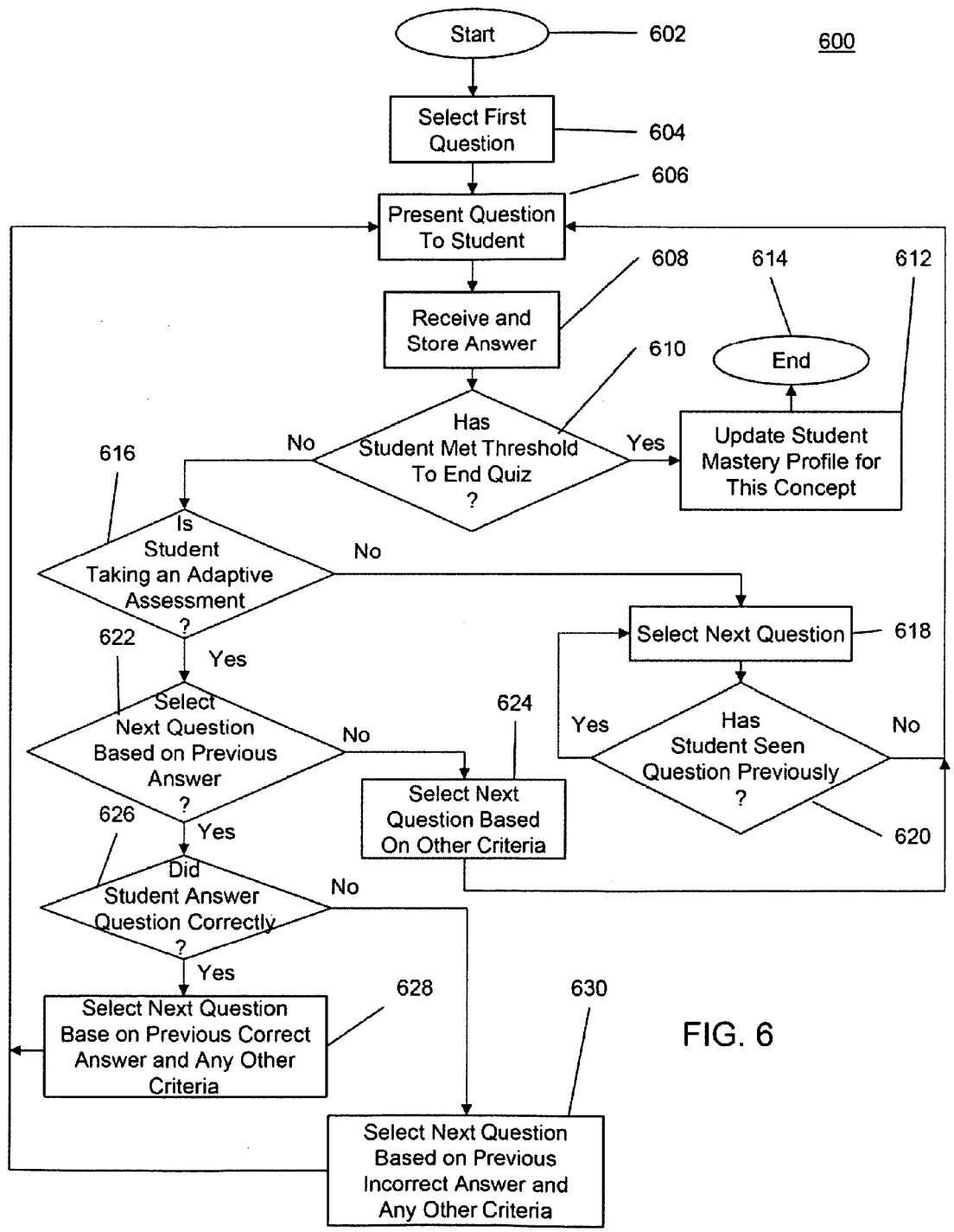
FIG. 6 is a diagram of a process for performing an assessment in accordance with some embodiments.

In some embodiments, an assessment can be performed as illustrated in process 600 of FIG. 6. As shown, after process 600 begins at 602, a first question for the assessment is selected at 604. This first question can be selected using any suitable mechanism, including randomly or based upon a pre-determined starting point. At 606 the question can next be presented to the student. Presentation of the question can be performed in any suitable manner, such as by displaying it on a computer display, playing audio of the question, etc. An answer from the student can next be received and stored at 608. This answer can be entered by the student using any suitable user-input device, such as a keyboard, mouse, voice recognition systems, etc. At 610, it can then be determined whether the student has met a threshold to end the assessment. Any suitable threshold can be used. For example, a threshold can be based on the a percentage of the total number of questions in the assessment answered correctly, based upon answering a certain number of questions, based upon spending a certain amount of time on the quiz, based on a certain number of points reached for questions having different point values, based on reaching a certain level of difficulty of questions by correctly answering lower level questions, by answering all of the available questions, etc. If the student has met the threshold, a student mastery profile for this student and concept can be updated at 612 and process 600 terminated at 614.

If it is determined that the student has not met the threshold, however, process 600 can then determine at 616 if the student is taking an adaptive assessment. An adaptive assessment can include an assessment that varies questions based criteria, such as a student's response to previous questions. If the assessment is determined to not be adaptive, then a next, previously unseen question can be selected at 618 and 620, and the next question presented by looping back to 606.

If it is determined, at 616, however, that the assessment is adaptive, then, at 622, it can be determined if the next question is to be selected based on the previous answer. If the next question is determined to not to be selected based on the previous answer, then the next question is selected based on other criteria (which can be any suitable criteria) at 624, and the next question presented by looping back to 606.

If it is determined at 622 that the next question is to be selected based on the previous answer, then at 626 it can be determined if the student answered the previous question correctly. If the student did answer the previous question correctly, then the next question can be selected at 628 based on the previous correct answer and any other suitable criteria. Otherwise, the next question can be selected at 630 based on the previous incorrect answer and any other suitable criteria. After the next question has been selected at 628 or 630, that question can then be presented by looping back to 606.

For example, in some embodiments, when a next question is to be selected based on the previous answer, and the previous answer was incorrect, a less difficult question can be selected. Difficulty can be based upon expert judgment. Difficulty can also be determined by user statistics. User statistics can come from measuring student performance on a question by subgroup (such as looking at how many high performing students answered a question correctly). Difficulty can also be calibrated. Questions can be selected from a pre-defined subgroup of questions. Additionally or alternatively, questions can be drawn from an unrestricted pool and selected based on categorization tags applied to the questions and on difficulty levels associated with the questions. The next question can additionally or alternatively be selected based on additional selection criteria, such as the ability of the next question to differentiate between test takers, the expected difficulty of the question relative to the ability of the test-taker, the ability or likelihood of the test taker to guess on the next question, etc.

Returning to FIG. 5, once the assessment has been performed at 504, the results of the assessment can be stored in a student performance database at 506. Any suitable performance data can be stored, such as the answers to each question, the score obtained, the highest level of difficulty of question answered correctly, the specific concepts answered correctly, the specific concepts or questions answered incorrectly, etc. At 508, the student concept mastery profile can be updated. Concept mastery can be defined as achieving a certain percentage of the question set correctly answered. Concept mastery can additionally or alternatively be defined as a student correctly answering a question at a particular difficulty level. Concept mastery can additionally or alternatively be defined as a student reaching a certain theta (expected ability level).

The student's concept mastery profile and performance on the assessment can then be used, at 510, to tailor the student's initial syllabus to the student by selecting lessons and/or concepts addressing areas where the student has not mastered the assessed concepts. Tailoring can include, but is not limited to, altering the default difficulty level of questions presented in the course, recommending additional workshops, changing the student's schedule by adding or removing required lessons and/or concepts, etc. Content may include, but is not limited to, explanatory material, classes (live or archived), videos, short or long format games, game-like content, interactive content, tutorials etc.

At 512, lessons and/or concepts highly related and/or correlated to the lessons/concepts in the student's syllabus can also be identified and added to the syllabus in some embodiments. In this way, concepts may be learned more easily in some embodiments by learning a group of related concepts together. Finally, at 514, process 500 may terminate.

Returning to FIG. 4, after getting a syllabus at 406 or creating a syllabus at 408, process 400 can next determine at 410, based on the syllabus, whether a concept or lesson is to be taught. If a concept is to be taught, the next concept from the syllabus can be assigned to the student at 412. Otherwise, the next concept from a lesson to be taught is assigned to the student at 414.

Figure 7:
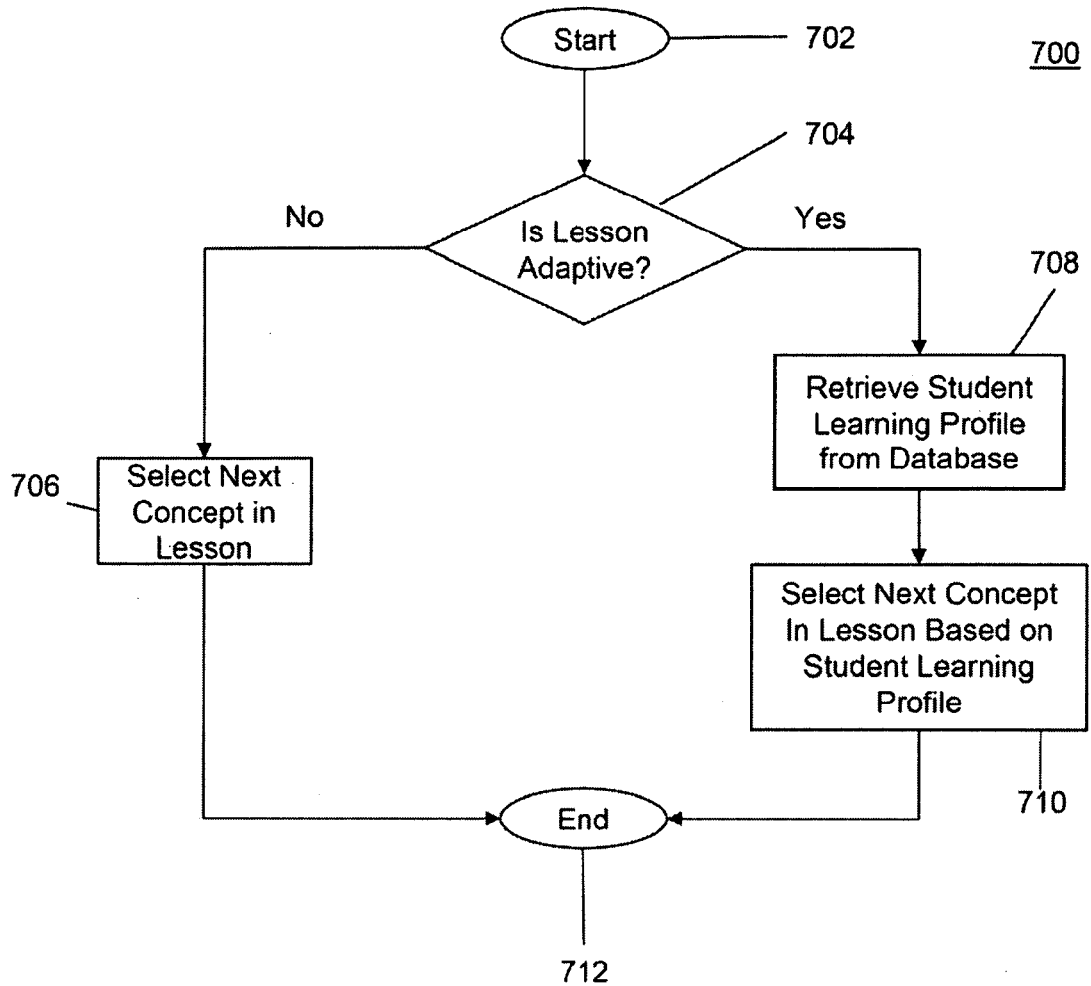
FIG. 7 is a diagram of a process for selecting a concept from a lesson in accordance with some embodiments.
Figure 8:
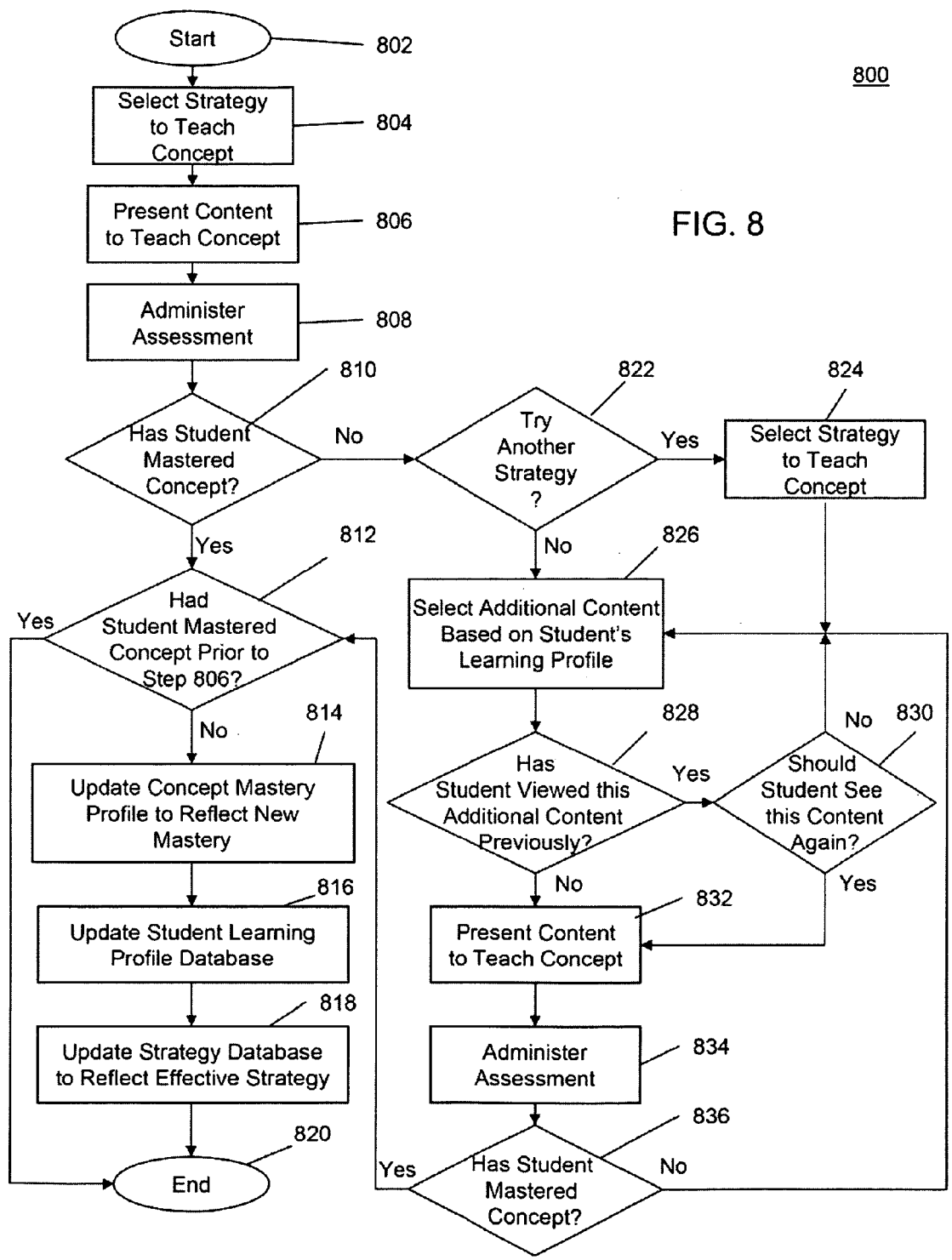
FIG. 8 is a diagram of a process for presenting a concept in accordance with some embodiments.

Turning to FIG. 7, an example of a process 700 for assigning a concept from a lesson that can be used in some embodiments is illustrated. As shown, after beginning at 702, the process can first determine whether the lesson is adaptive at 704. This determination can be made based on the parameters of the lesson. If the lesson is determined to not be adaptive, then the next concept in the lesson can be selected and assigned at 706. Otherwise, if the lesson is determined to be adaptive, then the student's learning profile can be retrieved from a database at 708, and the next concept in the lesson selected based on the student learning profile. For example, in some embodiments, the student learning profile can indicate the most-effective content types and learning strategies for a student for each concept, and can be used to predict and select optimal content for a student for a given concept or group of concepts. The student learning profile can include the most effective media type (such as, but not limited to, video versus text) for a student to learn a concept, student ability level, student performance with regards to question order and difficulty, etc. Once the next concept is assigned at 706 or 710, process 700 can terminate at 700.

Returning to FIG. 4, once a concept has been assigned at 412 or 414, the materials for the assigned concept can then be presented at 416 using any suitable approach. In some embodiments, for example, materials for an assigned concept can be presented as described in a process 800 shown in FIG. 8. As illustrated, after process 800 begins at 802, the process can first select a strategy to teach an assigned concept at 804. Any suitable mechanism can be used to select a strategy.

As described above, a strategy is a way in which a concept can be taught to a student. For example, one strategy can be to teach using video content. A strategy can include permutations or combinations of student actions. A strategy can include a student viewing content in a new order, a student mastering one concept before another, a student viewing a new piece of content prior to mastering a concept, etc. As a strategy for teaching a concept proves to be more and more effective, it may be more likely that this strategy will be selected for teaching that concept to other students. In this way, effective content is presented to students. To facilitate selecting the best strategies, content within the database can be scored so that content with higher scores indicates that that content is more effective for students at a given level of mastery or having a given learning style. Each time a student consumes a newly uploaded or created piece of content, that student can create a new strategy, which can then be used to teach other students.

Figure 9:
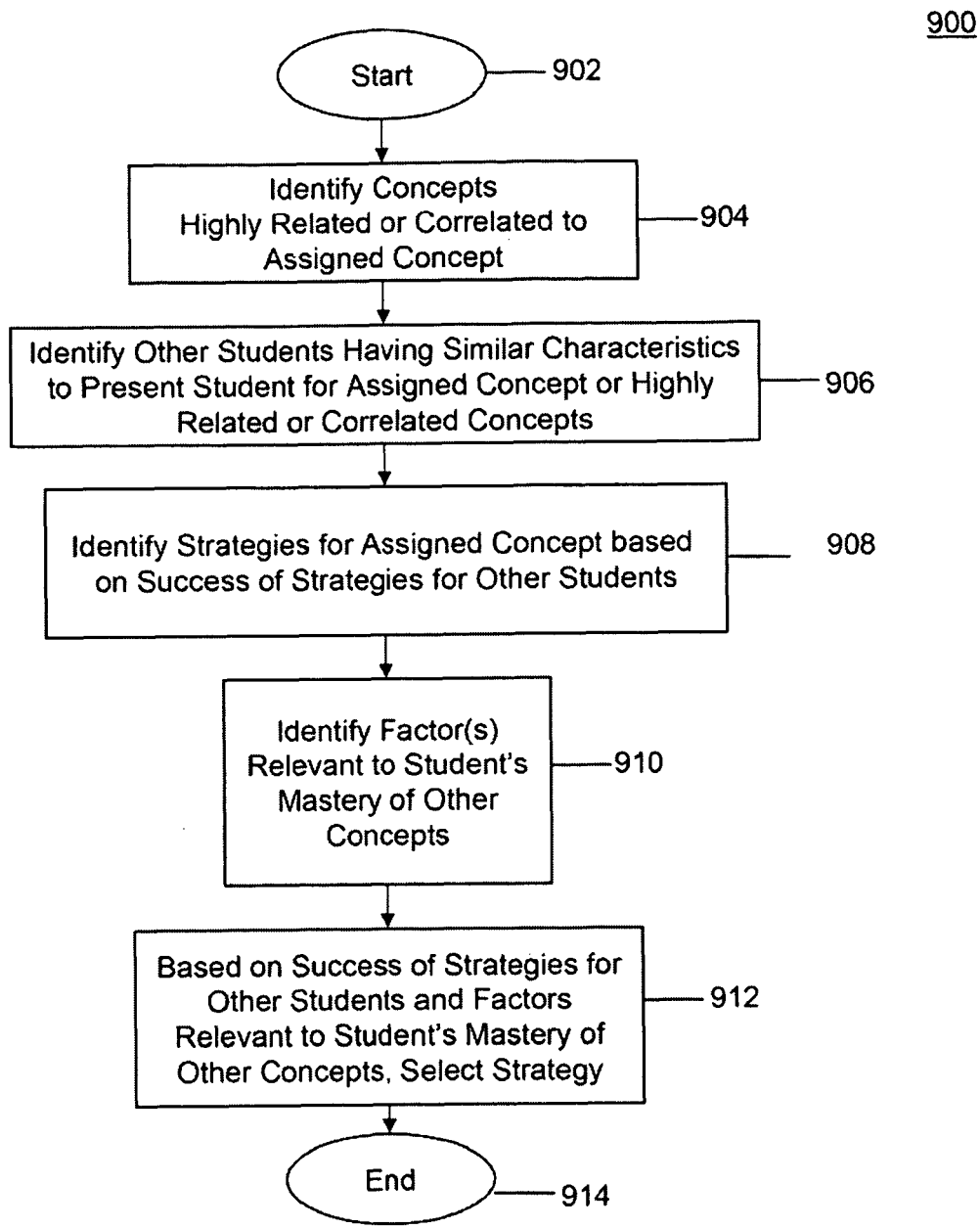
FIG. 9 is a diagram of a process for selecting a strategy for presenting a concept in accordance with some embodiments.

For example, a process 900 of FIG. 9 can be used to select a strategy in some embodiments. As illustrated, in this process, after beginning at 902, highly related or correlated concepts to the assigned concept can be identified at 904. Any suitable relationship and/or correlation between concepts can be used in some embodiments. For example, two concepts may be related and/or correlated because one is in the same category as another, because one builds upon another, because one is analogous to another, etc. Next, at 906, other students having similar characteristics to the present student for the assigned concept or highly related and/or correlated concepts can be identified. Any suitable characteristics and/or criteria for determining that the other students are similar to the present student can be used in some embodiments. For example, two students can be determined as having similar characteristics if they both learn well from similar types of materials (e.g., videos). Strategies for teaching the assigned concept can then be identified based on the success of the strategies for the other students at 908. Any suitable mechanisms can be used to determine the success of the strategies for the other students, and for identifying those strategies for the assigned concepts. For example, a strategy can be determined as being successful if it results in a successful assessment after being presented. Next, at 910, factor(s) relevant to the student's mastery of other concept can then be identified. Any suitable factors can be used, and any suitable technique for identifying these factors as being relevant can be used. For example, factors can include whether the content is in a specific media type (e.g., video, cartoon, cross word puzzle, etc.), the frequency with which content is delivered (e.g., once per week for six weeks, with a review one month later), the length of a session in which content is presented (e.g., 15 minutes versus 90 minutes), the level of difficulty of the content (e.g., too hard, too easy, etc.), the number and type of questions (e.g., 100 true/false questions versus 20 case study questions), whether the content is delivered with related content, etc. As another example, techniques that can be used to identify factors as being relevant to the student's mastery of concepts can include reviewing the student's pre-determined learning style, the student's past performance on assessments when a factor is present, the amount of time a student spends learning when a factor is present, the current level of ability of the student, etc. Finally, based on the success of strategies for other students and the factors identified as being relevant to the student's mastery of other concepts, a strategy for the assigned concept can be selected at 912. Any suitable technique can be used for selecting this strategy. For example, a strategy can be selected by weighting factors determined to be relevant to the student's mastery of concepts based on any suitable criteria (e.g., such as an assessment score, how those criteria impact other students, etc.). The weighting approach can be changed dynamically in some embodiments. As another example, a strategy can be selected by identifying one strategy from a given number of the most-successful strategies for other students that has the highest number of factors relevant to the teaching of the present student. Once the strategy has been selected, process 900 can terminate at 914.

Turning back to FIG. 8, once a strategy for teaching a concept has been selected at 804, content consistent with that strategy for the concept can then be presented at 806. The content can be presented in any suitable manner consistent with the strategy. For example, if the strategy indicates that the content should be presented as video, then the content can be presented on a video display to the student. After the content is presented, an assessment of the student's knowledge can be administered at 808. Any suitable technique for administering an assessment can be performed, for example as illustrated and described above in connection with FIG. 6. Next, at 810, it can be determined if the student mastered the concept. Any suitable technique can be used to determine if the student mastered the concept. For example, concept mastery can be defined as achieving a certain percentage of the question set correctly answered. Concept mastery can additionally or alternatively be defined as a student correctly answering a question at a particular difficulty level. Concept mastery can additionally or alternatively be defined as a student reaching a certain theta (expected ability level).

If it is determined at 810 that the student did master the concept, then at 812, it can be determined whether the student mastered the concept prior to 806. If so, process 800 can terminate at 820. Otherwise, process 800 can update the concept mastery profile for the student to reflect the new mastery of the concept at 814, update the student's learning profile at 816 (e.g., by storing the number of questions needed to achieve mastery, the time take to master the concept, when the student saw the content for the concept, the type of content from which the concept was mastered, etc.), and update the strategy database to reflect the effective strategy at 818, and then terminate at 820.

Figure 10:
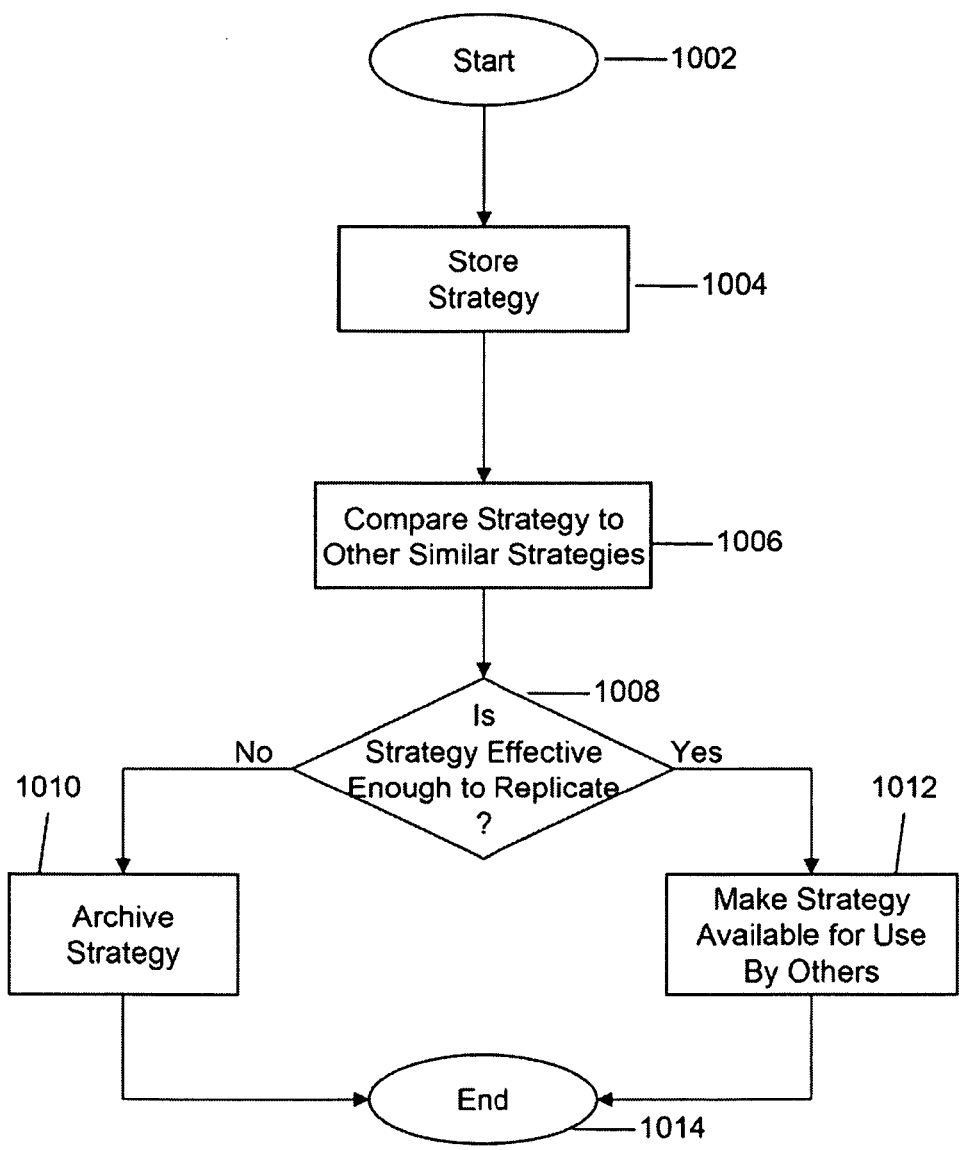
FIG. 10 is a diagram of a process for updating a strategy in accordance with some embodiments.
Figure 11:
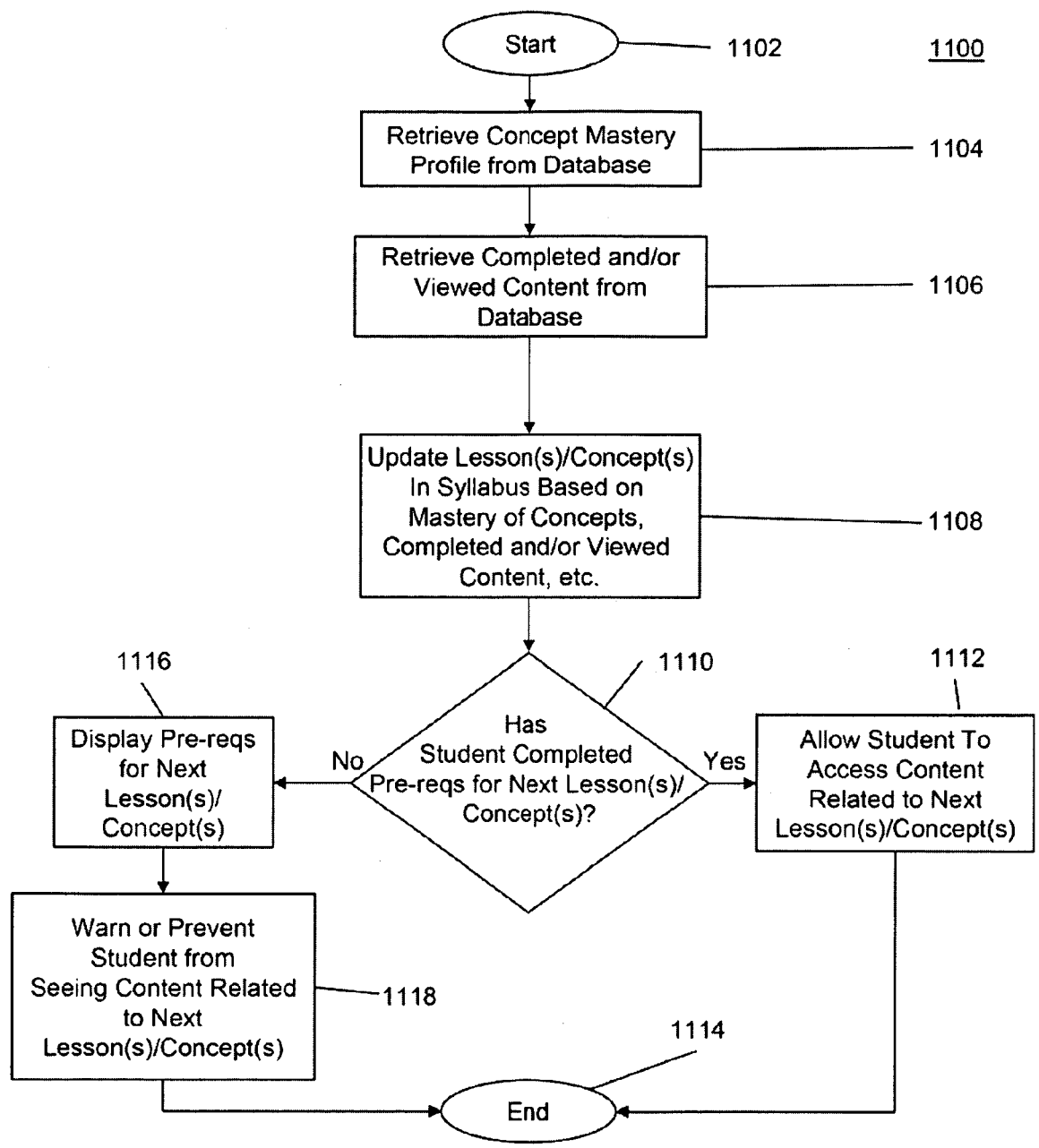
FIG. 11 is a diagram of a process for updating a syllabus in accordance with some embodiments.

An example of an approach to updating the strategy database in accordance with some embodiments is illustrated as process 1000 in FIG. 10. As shown, after process 1000 begins at 1002, any suitable information about the strategy can be stored at 1004. Next, at 1006, the strategy can be compared to other similar strategies. For example, the comparison can compare relative improvements of students based on the exposure to each strategy. Based on this comparison, at 1008, it can be determined whether the strategy is effective enough to replicate. For example, strategies that did not result in a better improvement in performance than other strategies can be deemed as not being effective enough to replicate. In such situations, the strategy can be archived at 1010 and process 1000 terminated at 1014. Otherwise, process can make the strategy available for use by other students in the strategy selection process (e.g., as illustrated in FIG. 9).

Returning to FIG. 8, if it is determined at 810 that the student has not mastered the concept, then process 800 can determine at 822 if it should try another strategy. Any suitable technique for determining whether to try another strategy can be used. For example, the process can determine to try another strategy if the previously selected strategy was very similar in likelihood of successfully teaching the concept to other strategies. If it is determined to try another strategy, then another strategy can be selected at 824 as described above in connection with 804. After another strategy has been selected, or if it is determined that another strategy is not to be selected, additional content related to the concept can then be selected at 826 based on the student's learning profile. For example, additional content related to the concept can be selected that has characteristics consistent with the student's learning profile (e.g., content that is in video format when the user's learning profile indicates that the user learns well with video content). As another example, additional content can be selected based on content difficulty, content effectiveness for a particular population or subpopulation, content effectiveness for a student's learning style, content media format, the length of time it took students to master concept after seeing content (content efficiency), etc.

As another example, in some embodiments, additional content can be a mini-class session. This session can include a deeper discussion of concepts discussed in core content of the concept. This can mean a more basic discussion of key concepts for the benefit of students who need additional help, or it can mean a more in depth and detailed discussion for the benefit of advanced students. Additionally, these mini-class sessions can cover concepts that were not a part of the core curriculum or content. Mini-class sessions can vary in length and be any suitable length (e.g., such as ten minutes or an hour). These mini-class sessions can include a single type of content or multiple content and media types. Mini-class sessions can include questions. Some mini-class sessions can be targeted at specific populations or subgroups. Some mini-class sessions can be automatically assembled. Some mini-class sessions can be predefined by a user or an instructor.

Next, at 828, it can be determined if the student has been presented with this additional content previously. If so, then it can be determined at 830 whether the student should be presented with this content again. Any suitable technique can be used to determine if the student should be presented with this content again. For example, if the student learns well from reviewing the same materials multiple times, then it may be determined that the student is to be presented with the content again and process 800 can proceed to 832 to present the content (e.g., as described above in connection with 806). Otherwise, if it is determined that the student is to not be presented with the content again, then process 800 can loop back to 826 to select other additional content.

After the additional content is presented at 832, another assessment can be administered at 834. Any suitable technique for administering an assessment can be performed, for example as illustrated and described above in connection with FIG. 6. Next, at 836, it can be determined if the student mastered the concept. Any suitable technique can be used to determine if the student mastered the concept as described above in connection with 810. If it is determined that the student has mastered the content, then process 800 can loop to 812. Otherwise, process 800 can loop to 826 to select additional content.

Returning to FIG. 4, after concept materials are presented at 416, process 400 determines at 418 whether the student's study session is completed. If the study session is not completed, then process 400 selects the next concept from the syllabus or lesson (e.g., as described above in connection with 414). Otherwise, process 400 updates the student's syllabus at 422 and terminates at 424. Any suitable technique for updating the syllabus can be used in some embodiments. For example, process 1100 of FIG. 11 can be used to update the syllabus. As shown, after beginning at 1102, process 1004 can retrieve the concept mastery profile for the student from the database. Next, at 1106, the process can retrieve the completed and/or viewed content for the student from the database. The lesson(s) and/or concept(s) in the syllabus can then be updated based on the student's mastery of concepts, completed and/or viewed content, etc. Once the syllabus, has been updated, process 1100 can determine whether the student has completed the pre-requisites for the next lesson(s) and/or concept(s) at 1110. If it is determined that the student has completed the pre-requisites, the student can be allowed to access content related to the next lesson(s) and/or concept(s) at 1112 and process 1100 terminated at 1114. Otherwise, the pre-requisites for the next lesson(s) and/or concept(s) can be displayed at 1116, the student warned or prevented from being presented with content related to the next lesson(s) and/or concept(s) at 1118, and process 1100 terminated at 1114.

Figure 12:
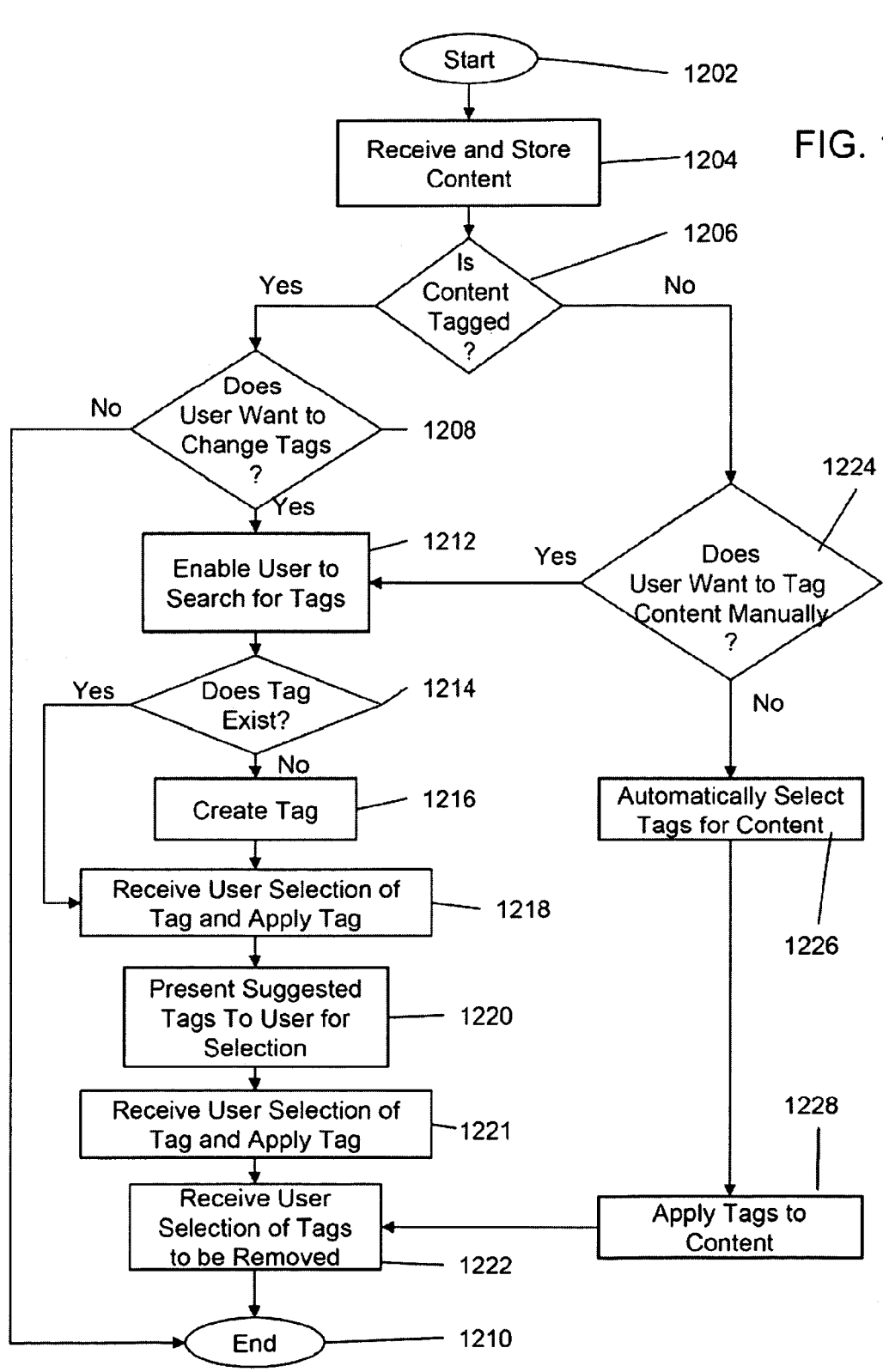
FIG. 12 is a diagram of a process for receiving and tagging content in accordance with some embodiments.
Figure 13:
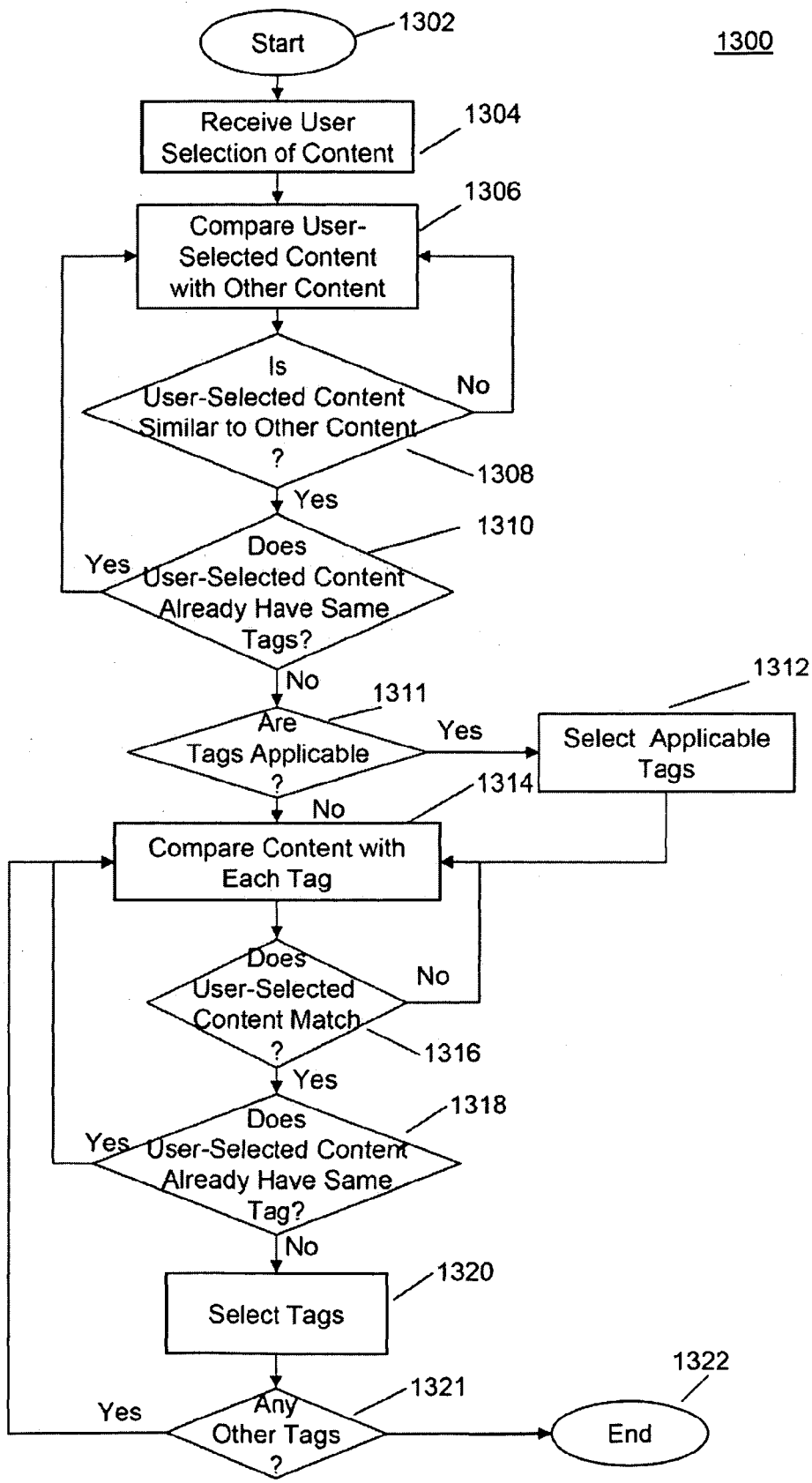
FIG. 13 is a diagram of a process for automatically selecting tags for content in accordance with some embodiments.

Turning to FIGS. 12-17, processes through which teaching content can be entered and managed in accordance with some embodiments are described. For example, as shown in FIG. 12, a process 1200 for submitting content by a user is illustrated. The user can be a content generator or a person who has acquired the content, either of which can be a teacher, for example. After process 1200 begins at 1202, the process receives and stores content at 1204. A user can enter content into the system in any suitable fashion. For example, a user can enter content through any text based system such as word processing software or a web browser. A user can additionally or alternatively upload content in file form through a file upload interface in a web browser or through a file transfer protocol. A user can additionally or alternatively enter content by speaking into a microphone or by speaking into a camera. A user can additionally or alternatively enter content through a web-based authoring system. Uploaded content can be in any suitable format. For example, in some embodiments, content can be uploaded in an un-editable format. In some embodiments, when uploaded in an un-editable format, the content can subsequently be converted to an editable format to facilitate editing as described herein. Content can be stored in any suitable fashion. For example, content can be stored in a field in a database or table. Content can also exist as a pointer to another file or database instead of being stored directly in a table.

Next, at 1206, it can be determined if the content is tagged. Content tagging is a process through which the content is categorized. For example, a question can be about Geometry; Triangles; Isosceles Right Triangles; 3:4:5 Isosceles Right Triangles; 6:8:10 Multiple of 3:4:5 Isosceles Right Triangles; etc. Each of these can be a tag. In addition to lagging by conceptual topic, content can also be tagged by difficulty (how difficult a given question is), type (word problem, chart, graph, true/false question, etc.), format (text content, live video content, canned video content), etc. Any suitable approach for tagging content can be used in some embodiments. For example, content can be tagged by assigning to a field in a database a value that corresponds to a tag. Tags can may be text or numerical, and/or include symbols. If it is determined that the content is tagged, it can be determined at 1208 it the user wants to change the lags on content. Any suitable technique can be used for making this determination. For example, the user can be asked if he or she wants to change the tags on the content. As another example, pre-defined user preferences can also determine whether the user wants to alter the tags on a piece of content. As part of changing tags, a user can also add or remove tags. If it is determined that the user does not want to change tags, then process 1200 can terminate at 1210.

If it is determined that the user does want to change tags, however, then at 1212 the user can be enabled to search for tags. Any suitable mechanism for enabling the user to search for tags can be used. For example, the user can be provided with a search engine for searching tags in some embodiments. Such an engine can enable the user to search existing tags by multiple or a singular search terms. Such an engine can additionally or alternatively enable the user to search by whole words, partial words, and/or numbers. Such an engine can additionally or alternatively enable the user to use multiple search criteria or a single search criterion. As another example, the user can be presented with a list of available tags that can be browsed manually.

At 1214, it can then be determined if the tag the user searched for exists. If it is determined that the tag does not exist, then at 1216 the tag searched for by the user can be created. Any suitable approach for creating a tag can be used. Additionally or alternatively, the user can create tags by uploading a file containing tags, importing them from another source, etc. The user can also enter tags via a text based editor, web browser, etc. If it is determined at 1214 that the tag exists, or after the tag has been created at 1216, process 1200 can then receive a user selection of a tag and apply it to the content. As described above, application of a tag to content can be performed in any suitable manner, such as by entering it into a field in a database associated with the content.

Next, at 1220, process 1200 can also suggest tags. Tags can be selected for suggestion in any suitable manner. For example, tags can be selected for suggestion as described below in connection with FIG. 13. As another example, content can be analyzed to determine its type (e.g., audio, video, text, etc.) and its content. This analysis can look for keywords, symbols, variables, etc. in content. This analysis can additionally or alternatively search content (such as a video) to determine its semantic content and suggest tags. The user can then select to apply any or all of the suggested tags at 1221.

At 1222, process 1200 can then receive a user selection of tags to be removed from the content. For example, a user can be enabled to remove automatically applied tags or tags that were previously manually selected by the user or another user. After the user has been given the opportunity to remove tags, process 1200 can then terminate at 1210.

If at 1206 it is determined that the content is not tagged, process 1200 can then determine at 1224 if the user wants to tag content manually or automatically. This determination can be made in any suitable fashion, such as by prompting the user or by checking a preference setting. If it is determined that the user wants to manually tag content, process 1200 can then branch to 1212 and proceed as described above. Otherwise, the process can select tags for the content. Any suitable process for selecting tags can be performed, such as that described below in connection with FIG. 13. Once the tags for the content have been selected, the tags can be applied to the content at 1228 and the user given the opportunity to remove tags at 1222 as described above.

As mentioned above, FIG. 13 illustrates an example of a process 1300 for automatically-selecting a tag for content in accordance with some embodiments. As shown, after process 1300 begins at 1302, the process can receive a user selection of content. This selection can be received in any suitable manner. For example, the selection can be received from another process in which the selection was previously made or can be received by prompting the user for a selection. Next, at 1306, the user selection can be compared to other content (which can be any other content available to process 1300, or a subset thereof). This selection can be made in any suitable manner using any suitable criteria or criterion. For example, media format, concepts used or tested, content structure, text, symbols, words or phrases contained in the content, etc. can be compared to determine similarity.

Next, at 1308, it can be determined if the user-selected content is similar to the other content so that the tags of the other content can be considered for application to the user-selected content. Similarity can be based on any suitable criteria or criterion. For example, process 1300 can consider media format, concepts used or tested, content structure, text, symbols, words or phrases contained in the content, etc. If the content is determined to be not similar, process 1300 can loop back to 1306 to compare other content. Otherwise, at 1310, the process can then determine whether the user-selected content already has the tags of the other content. If the user-selected content does have the same tags, then process 1300 can loop back to 1306 to compare other content. Otherwise, it can be determined if the lags are applicable at 1311. If so, the tags of the other content can be selected at 1312. Otherwise, the process can proceed to 1314.

At 1314, process 1300 can next compare the user-selected content to the available tags. In doing so, the user-selected content can be searched for keywords, symbols, numbers, or phrases that to see if they match an available tag. If it is determined at 1316 that the user-selected content does not match a tag, then the process can continue comparing other tags by looping back to 1314. Otherwise, process 1300 can determine at 1318 if the content already has the matched tag. If the content already has the tag, then the process can loop back to 1314. Otherwise, the process can select the tag at 1320. Then, process 1300 can determine if there are any other tags to compare at 1321. If so, the process can loop back to 1314. Otherwise, the process can terminate at 1322.

Figure 14:
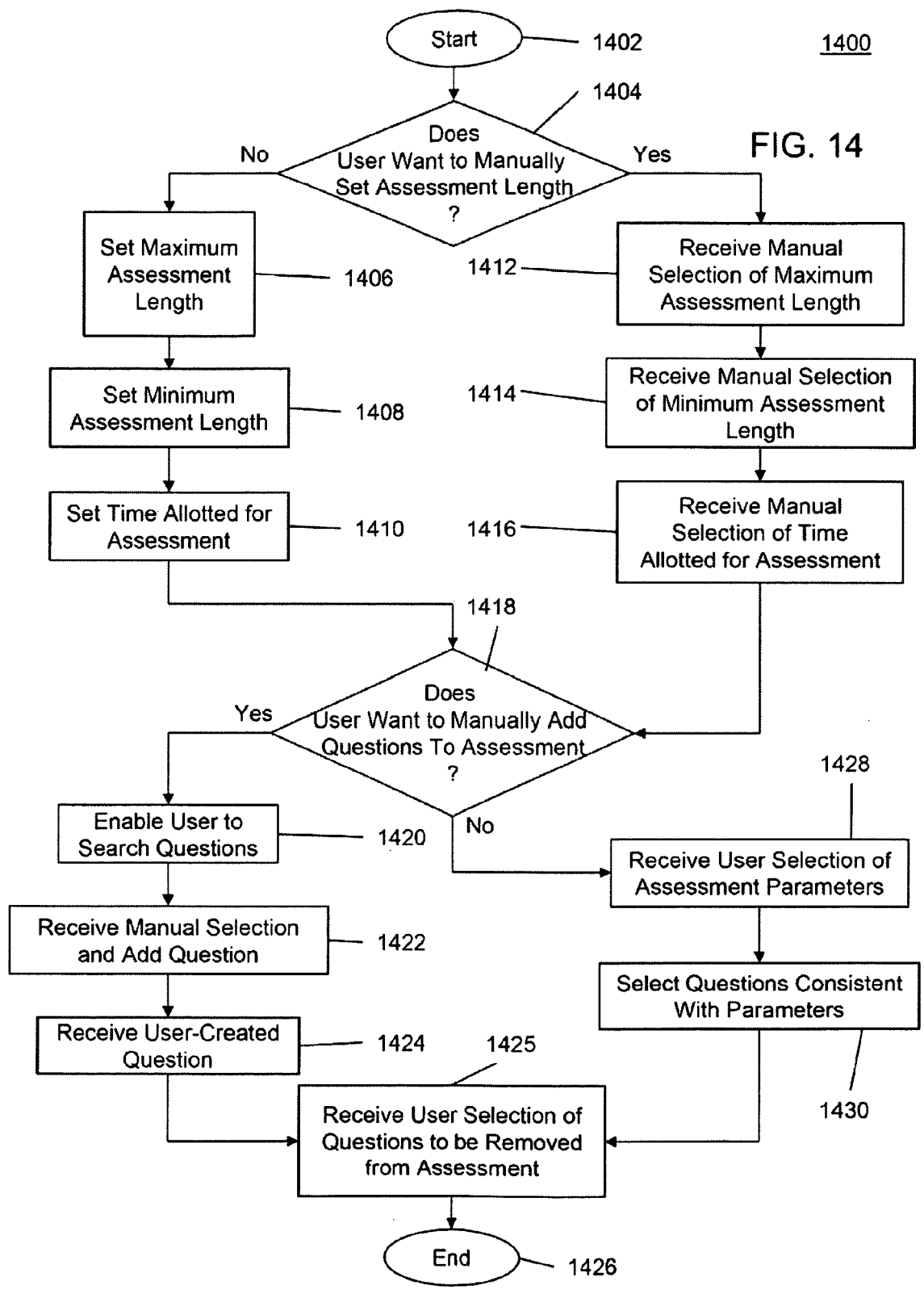
FIG. 14 is a diagram of a process for creating an assessment in accordance with some embodiments.

Turning to FIG. 14, a process 1400 for creating an assessment in accordance with some embodiments is illustrated. As describe above, assessments can contain any suitable mechanisms for evaluating student knowledge, such as True/False questions, multiple choice questions, free response questions, and/or any other suitable questions. After process 1400 begins at 1402, the process can determine if the user wants to manually set the assessment length at 1404. This determination can be made in any suitable manner, such as by prompting the user or checking a preference setting. If it is determined at 1404 that the user does not want to set the assessment length, process 1400 can then select the maximum assessment length. For example, the process can determine that the assessment will not be more than a given number of questions. Next, at 1408, the process can set the minimum assessment length. At 1410, the time allotted for the assessment can be set. For example, ten minutes may be allocated for the assessment. If it is determined at 1404 that the user does want to manually set the assessment length, then process 1400 can receive a manual selection of the maximum assessment length at 1412, a manual selection of the minimum assessment length at 1414, and a manual selection of the time allotted for the assessment at 1416.

After the time allotted for the assessment has been set at 1410 or 1416, the process can determine if the user wants to manually add questions to the assessment at 1418. This determination can be made in any suitable manner, such as by prompting the user, checking a preference, etc. If it is determined that the user wants to manually add questions to the assessment, then at 1420 the user can be enabled to search for questions. Any suitable mechanism for enabling the user to search for questions can be used. For example, a search engine (e.g., for search keywords, tags, etc.) can be provided, or the user can be presented with a list of questions. At 1422, the user can then select a question found at 1420 and add the question to the assessment. Additionally or alternatively, in some embodiments, the user can receive a question from the user at 1424. Any suitable mechanism for receiving a question can be used. For example, the user can upload a question in a file. As another example, the user can manually type in a question. Next, the user can remove questions if desired at 1425, and then the process can terminate at 1426.

If it is determined at 1418 that the user does not want to manually add questions to the assessment, process 1400 can then receive a user selection of assessment parameters at 1428. Any suitable parameters can be used, such as content difficulty, certain concepts, certain tags, certain lessons or classes, etc. Next, at 1430, the process can select questions consistent with the parameters selected. Any suitable approach to selecting questions can be used. For example, the parameters selected by the user can be compared to the parameters of the questions and the questions selected if the parameters are close enough. Once the questions are selected, process 1400 can branch to 1425 to enable the user to remove questions, and then terminate at 1426.

Figure 15:
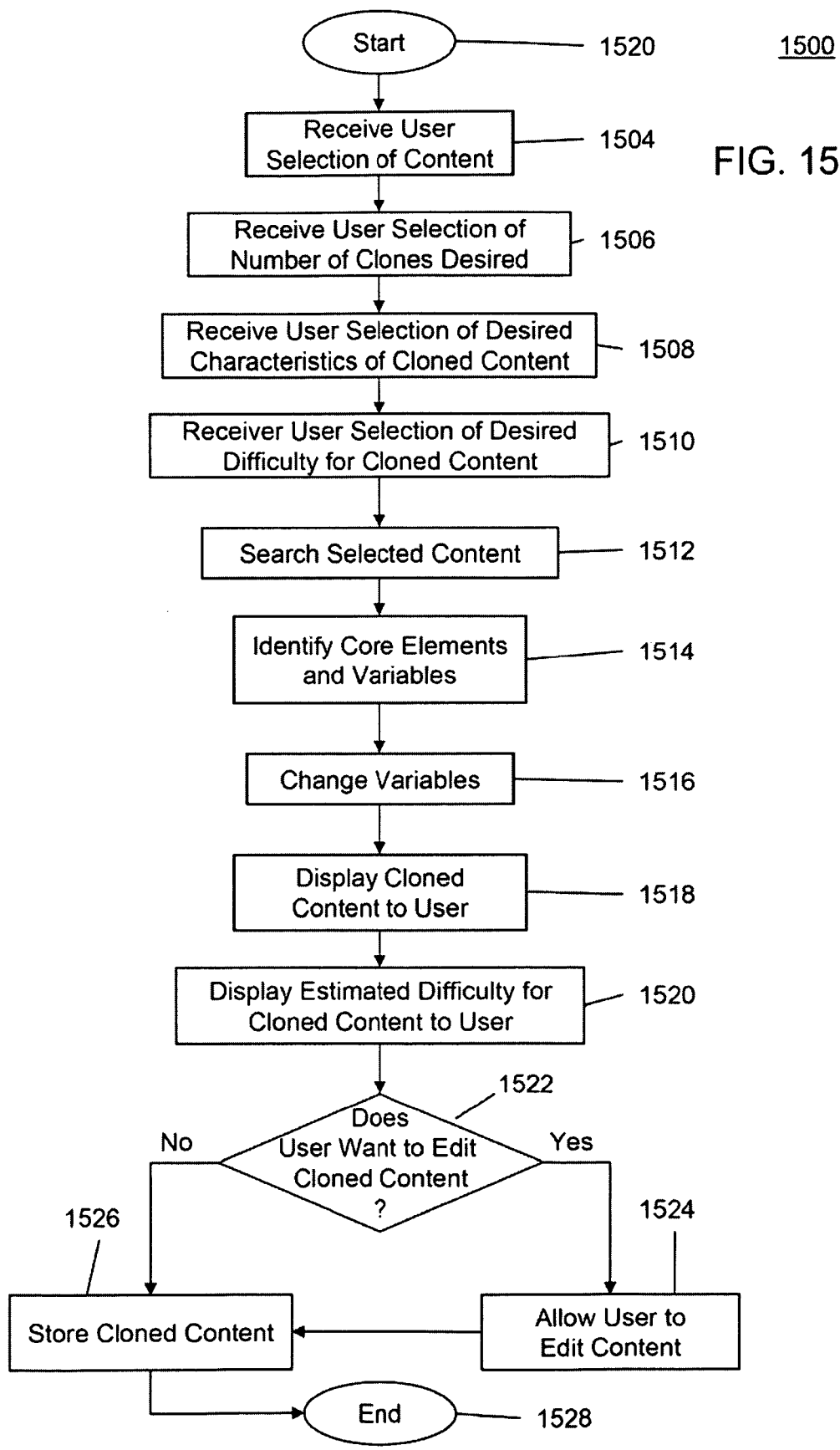
FIG. 15 is a diagram of a process for cloning content in accordance with some embodiments.

In some embodiments, it may be desirable to be able to copy content previously submitted so that the content can be changed slightly without re-creating the entire content from scratch. For example, this may be desirable when replicating assessment questions. A process 1500 that can be used to clone content in some embodiments is illustrated in FIG. 15. As shown, after process 1500 begins, the process can receive a user selection of content to be cloned. This user selection can be received in any suitable fashion. For example, a user can pick the content from a list or after finding the content using a search engine (e.g., using tags or keywords). Next, at 1506, a user selection of the number of clones desired can be received. At 1508, a user selection of the desired characteristics of the cloned content can be received. Characteristics can be structural characteristics in some embodiments. For example, a user may begin with a question that has Roman numeral statements and requires the system to produce versions that test the same concept(s), but in a word problem format. As another example, a user may want a multiple choice question to be cloned in a true/false or student generated response format.

At 1510, a user selection of the desired difficulty for the cloned content can be selected. When the user has selected more than one item of content to clone, the user may elect to require the same difficulty for versions of each item of content. Alternatively, the user may specify the number of versions at a specific difficulty level for each item of content that he or she desires. The user may elect to specify a number of variations at a specific level of difficulty for all items and change the number of versions required at a specific difficulty level for specific items.

Process 1500 can then search the user selected content at 1512. Any suitable technique for searching the user-selected content can be used. For example, the process can search the content for the concepts tested, content structure, keywords, symbols, phrases, numbers, etc. Core elements and variables in the content can then be identified at 1514. Core elements may pertain to the concepts tested by an item. Variables may pertain to elements of the content that may be changed without affecting the core concepts tested by that content. Examples of variables can include the "x" in the statement $x^2+2$. Another example is the setting of a logic problem.

Next, at 1516, process 1500 can change the variables in a question. Examples of changing variables can include changing the "x" in the statement $x^2+2$ to "y" to produce the statement $y^2+2$. Another example is changing the setting of a logic problem from an airport to a bus station. The cloned question can then be displayed to the user at 1518, and the estimated difficulty for the cloned question estimated at 1520. Difficulty of the cloned question can be estimated based upon an analysis of the text of a cloned item of content, comparison of the cloned content with the original content (which may have had a difficulty rating), comparison of difficulty with other similar content, etc.

At 1522, it can be determined if the user wants to edit the cloned content. This determination can be made in any suitable manner, such as by prompting the user or checking a preference setting. If it is determined that the user wants to edit the question, then the user can be allowed to edit the content at 1524. Otherwise, or after the content is edited, the cloned content is stored at 1526 and process 1500 terminated at 1528.

Figure 16:
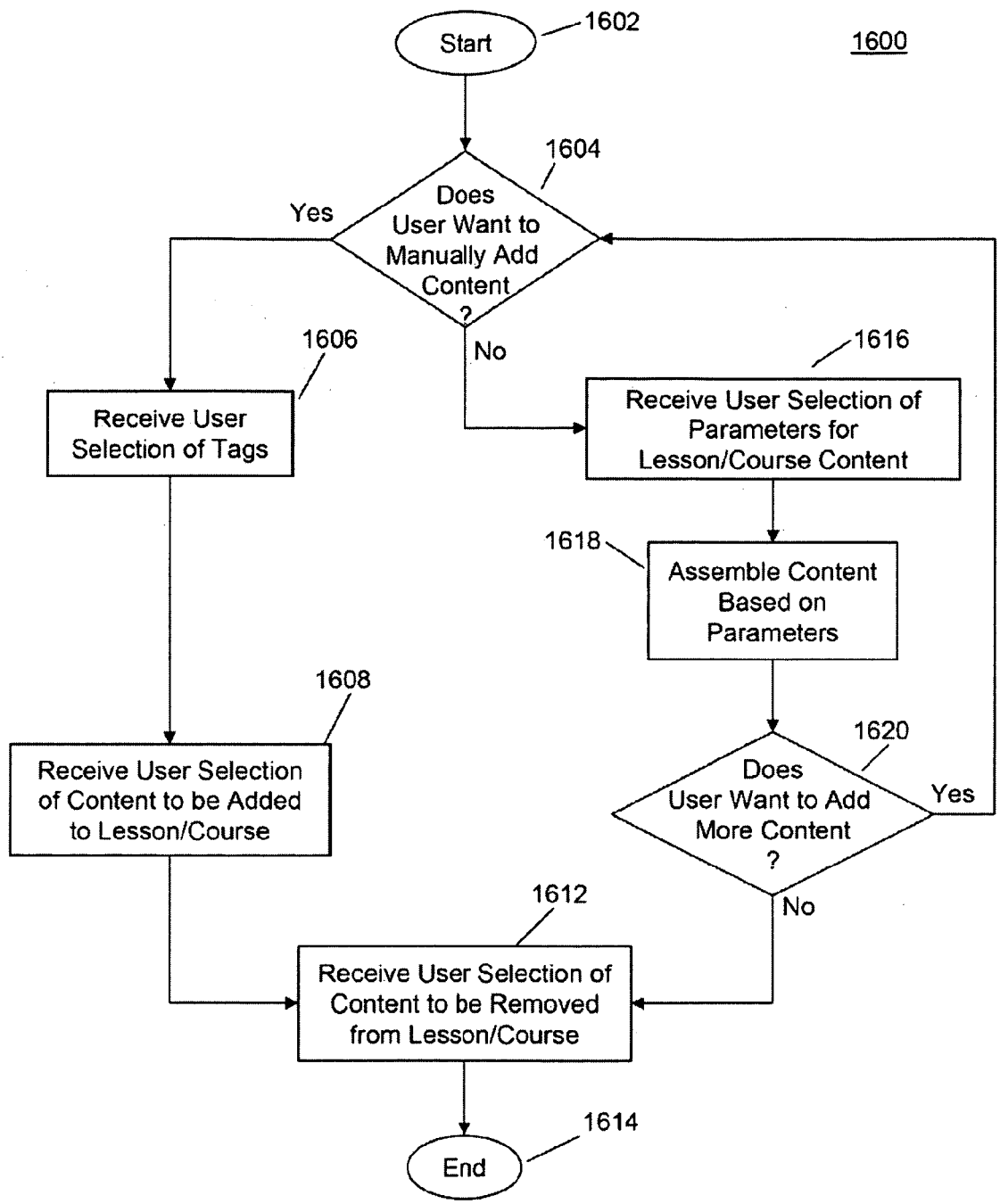
FIG. 16 is a diagram of a process for creating a lesson and/or course in accordance with some embodiments.
Figure 17:
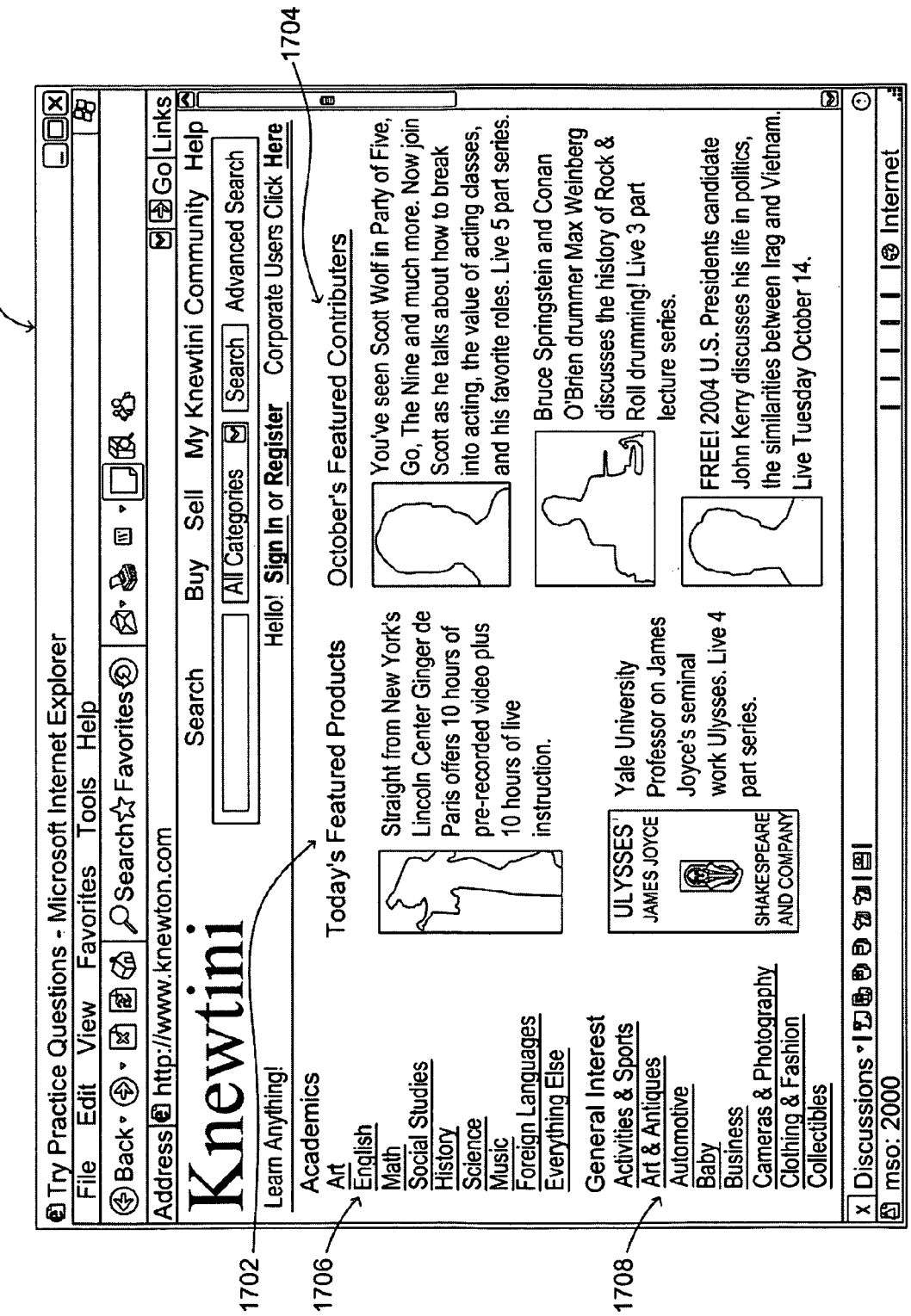
FIG. 17 is a diagram of an interface for a content marketplace in accordance with some embodiments.

A process 1600 for creating a lesson and/or course in accordance with some embodiments is now described in connection with FIG. 16. As shown, after process 1600 begins at 1602, the process can determine if the user wants to manually add content to the lesson/course at 1604. This determination can be made in any suitable manner, such as prompting the user or checking a preference setting. If it is determined that the user does want to manually add content, then at 1606 the process can receive a user selection of tags associated with the desired content and lesson/course. The user selection can be made from any suitable interface. For example, the user can select tags from a list of tags, a data entry field, etc. Next, at 1608, the user can select content to be added to the lesson/course. This content can be selected in any suitable manner. For example, the user can select this content from a list of available content (which can be generated based on the tags selected), by entering the content (e.g., in a data entry field, from a file, etc.), etc. Next, user selections of content to be removed from a lesson/course can be received at 1612 and then process 1600 can terminate at 1614. The user may desire to remove content that was erroneously included in the lesson/course or that was entered during a previous creation or editing of the lesson/course.

If it is determined at 1604 that the user does not want to manually add content to the lesson/course, then at 1616 process 1600 can receive a user selection of parameters for lesson/course content. Sample parameters can include difficulty, certain concepts, certain tags, learning profile score, discrimination, ability level, media type, etc. At 1618, the process can then assemble content based on the parameters. For example, content can be added to the lesson/course having tags, keywords, etc. that are consistent with the parameters. Next, it can be determined if the user wants to add more content. This determination can be made in any suitable manner, such as prompting the user or checking a preference setting. If the user does want to add more content, then the process can loop back to 1604. Otherwise, the process can proceed to 1612 to enable the user to select content to be removed as described above.

There is a very large community of talent around the world having members who possess expertise and would like to be paid to share that expertise, but have previously lacked the infrastructure to do so. University professors, scientists, researchers, handymen, artists, celebrities, and many others all have a valuable level of training and expertise. To facilitate these individuals being able to sell content related to concepts in which they have expertise, in some embodiments, an online marketplace to purchase, sell, and manage content can be provided. Content in this marketplace can include canned video, live video lessons, interactive text, rich media, and/or any other suitable content, and/or any combination thereof. Using the online marketplace, users can be able to: post content to a central server for secure storage; use authoring tools to create, change, or edit content more effectively than they do now; use an auto-tagging algorithm to tag all of their content; produce adaptive learning syllabi; manage live or pre-recorded classroom sessions; etc. Other uses can then view the offerings in a marketplace. An example of a user interface for viewing such offerings is illustrated as interface 1700 of FIG. 17. As shown, this interface includes daily feature content 1702, monthly featured content 1704, content organized by academics 1706, and content organized by other general interest categories 1708. Of course, any suitable interface can be used for a content marketplace.

Figure 18:
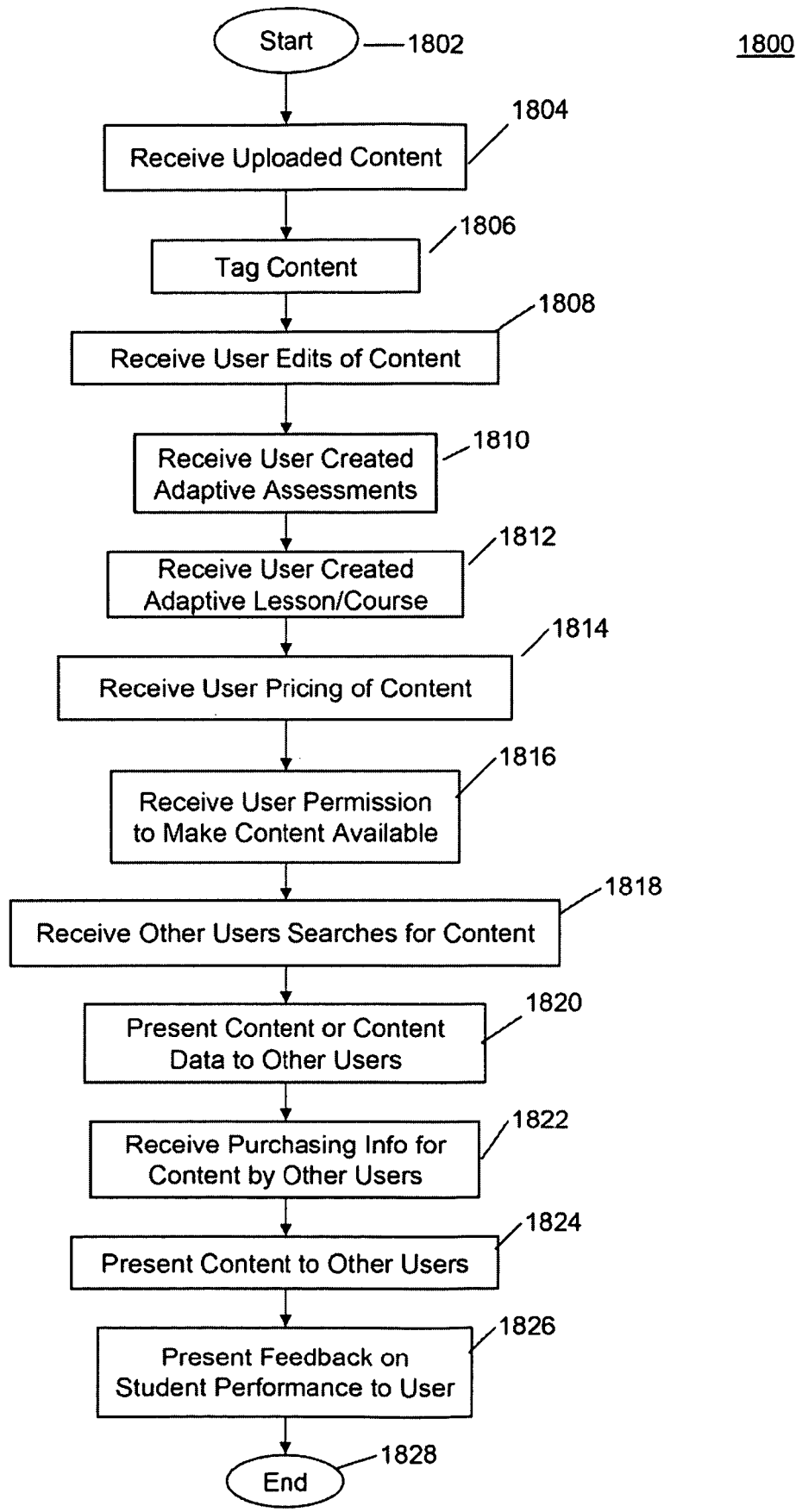
FIG. 18 is a diagram of a process for a content marketplace in accordance with some embodiments.

An example of a process that can be used to provide such a marketplace in accordance with some embodiments is illustrated in FIG. 18. As shown, a process 1800 can begin at 1802 and then receive uploaded content at 1804. This content can be uploaded in any suitable fashion (as described above), such as by receiving the content using a Web site upload interface. Next, at 1806, the content can be tagged. Any suitable mechanism for tagging the content can be used. For example, the uploading and tagging can be performed as described above in connection with FIGS. 12 and 13. At 1808, the user can be able to edit the content. Any suitable mechanism can be provided to enable the user to edit the content. For example, a Web-site-based document editor can be provided. To the extent the content uploaded is not in an editable format when received, in some embodiments, the content can be converted to an editable format. Next, at 1810, a user created adaptive assessment can be received. Any suitable technique for receiving this assessment can be utilized. For example, an assessment can be created as described above in connection with FIG. 14. The user can also create an adaptive lesson or course for the content at 1812. This lesson or course can be created in any suitable manner, such as described above in connection with FIG. 16.

Then, at 1814, user pricing of the content can be received. This pricing can be received in any suitable way, such as a data entry field. The user can be assisted in establishing pricing by presenting pricing and/or descriptions of similar content with established pricing to the user. The user can use any approach for establishing pricing. For example, the user can set a flat, defined fee for his or her product, or the user can allow the market to set the price through an auction. Alternatively, the user can have variable pricing, packages, or volume discounts. Thus, the user has freedom to price his or her content as he or she deems appropriate.

Once the user is satisfied with his or her submission, the user's permission to make the content available to others can be received at 1816. This permission can be granted in any suitable manner.

Other users who are interested in accessing available content can subsequently perform searches for content at 1818. Any suitable mechanisms can be used to perform these searches (similarly to other content searches as described above). For example, searches can be performed using a search engine or by being presented with a list of available content. Next, at 1820, the content (or a portion thereof and/or content data (such as an abstract of the content, number of people who have viewed content, number of people who have purchased content, user ratings, reviews, sample content, effectiveness and ranking of content, content creator, etc.) can be presented to other users. Purchasing information (such as a credit card number, promise to pay, etc.) can then be received from the other users at 1822. Then, at 1824, the content can be presented to the other users in any suitable fashion, such as described above. Finally, at 1826, the feedback on student performance related to the content can be provided to the user assist the user in improving the content, and then process 1800 can terminate at 1828.

In some embodiments, a concept map view can be presented to assist a user in understanding how concepts relate to one another. An example of a concept map view 1901 is presented in an interface 1900 of FIG. 19. As shown, multiple levels of concepts 1902, 1904, and 1906 are presented. Each concept at a level can be related to the concept at the next higher level (e.g., level 1902 is at a higher level than level 1904, and level 1904 is at a higher level that level 1906) indicated by an arrow 1908 or 1910. Thus, for example, all of the concepts indicated in level 1906 are related to subtraction, and all of the concepts indicated at level 1904 are related to arithmetic. The user can click on any of the concepts listed to be presented with corresponding content.

Figure 20:
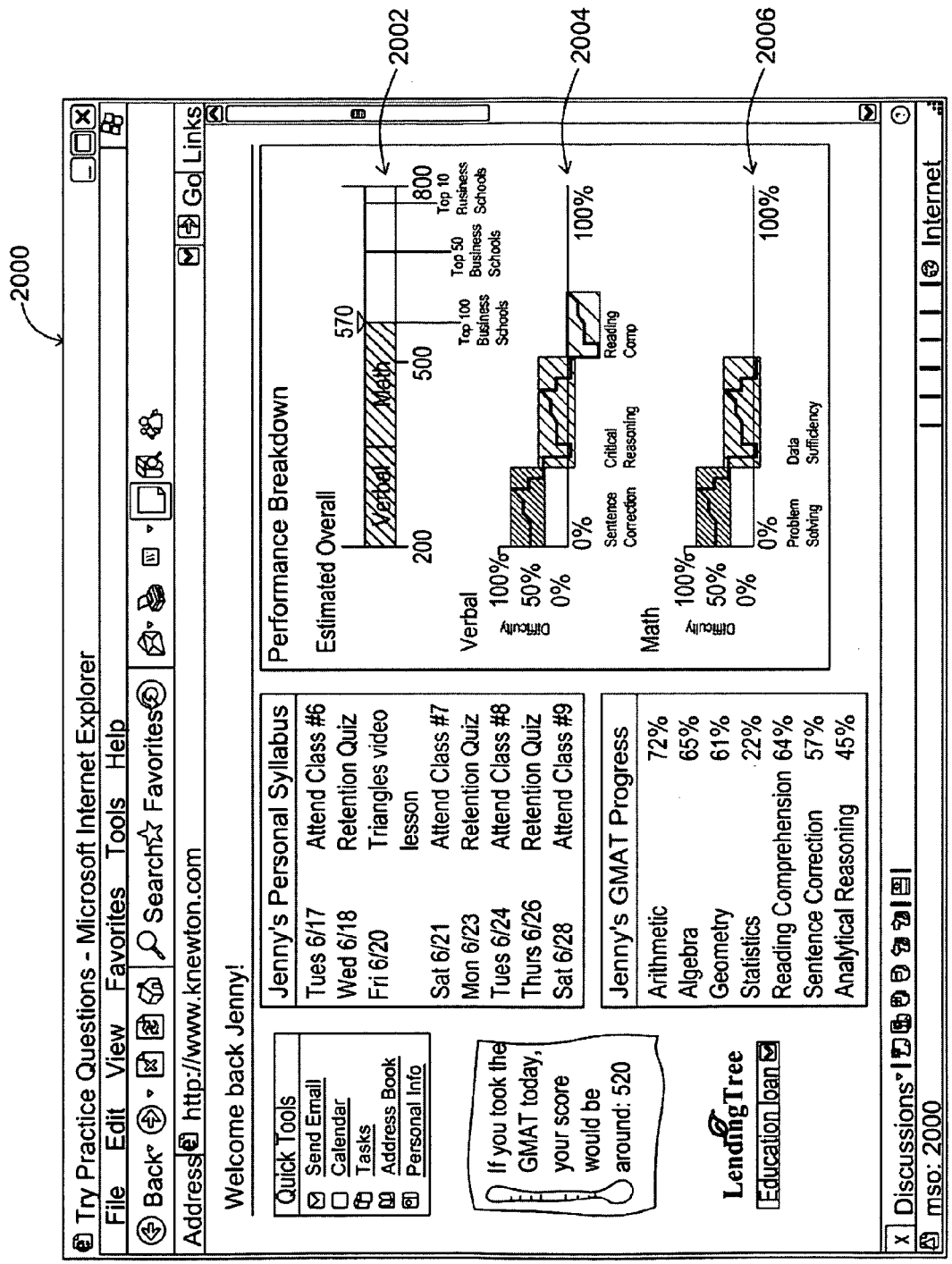
FIG. 20 is a diagram of an interface for a performance breakdown in accordance with some embodiments.

FIG. 20 shows an example of a performance breakdown display for estimated performance on a test that can be used in some embodiments. As shown, this display shows an estimated overall score at region 2002, a verbal breakdown at region 2004, and a math breakdown at region 2006. Within region 2002, the display shows the total estimated score for verbal and math portions of the test, the total estimated combined score for the test, and how such a score would position the student with respect to different goals (e.g., a top 100 business school, a top 50 business school, and a top 10 business school). Within regions 2004 and 2006, the verbal and math portions of the test show the student's performance in different portions of verbal and math as the student progresses. Although the performance breakdown display of FIG. 20 is illustrated in connection with math and verbal portions of a test, and further broken down as illustrated, this display can be used with any suitable portions of a test, and even study that is not in preparation for taking an examination.

Figure 21:
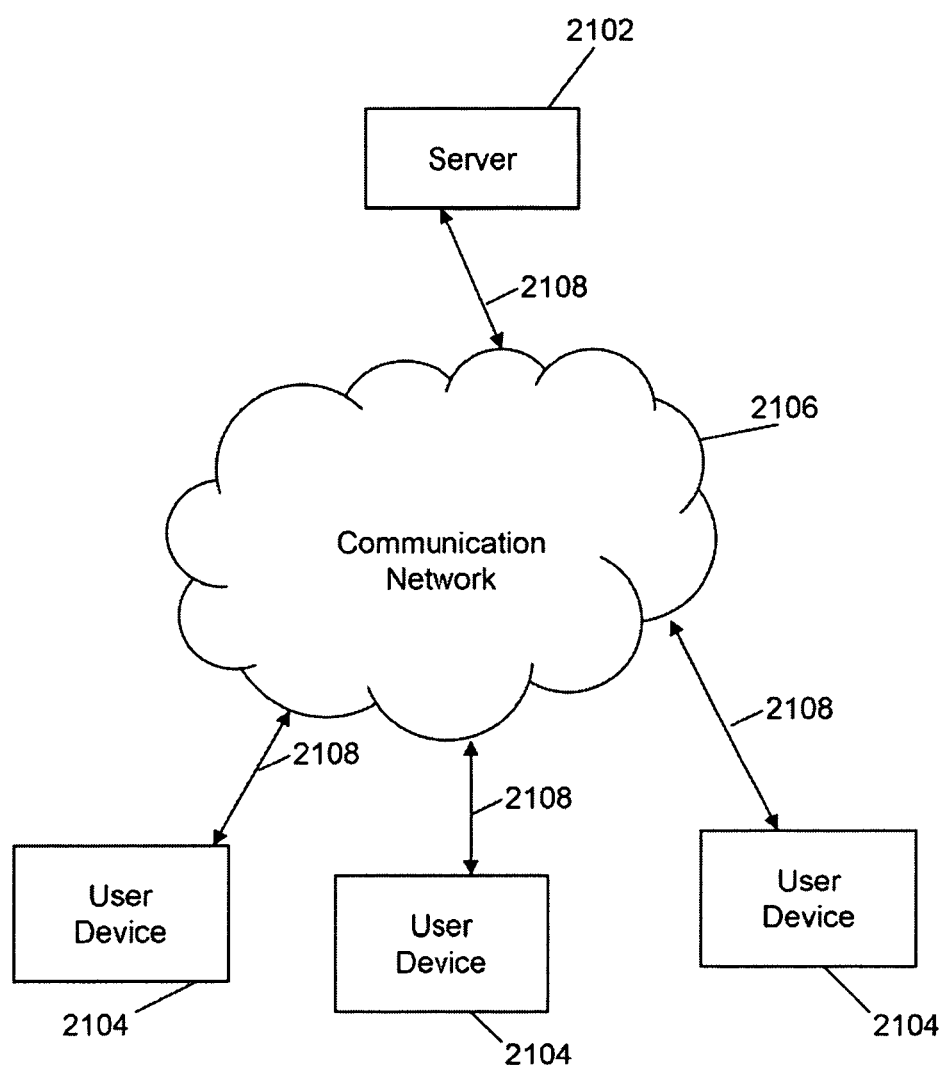
FIG. 21 is a diagram of system for implementing computer-based learning in accordance with some embodiments.

FIG. 21 illustrates an example of hardware that can be used to implement systems in accordance with some embodiments. As shown, system 2100 can include a server 2102 and one or more user devices 2104. Server 2102 and devices 2104 can be any suitable server, data processing device, personal computer (such as a desktop computer, a laptop computer, a tablet computer, a pen-based computer, etc.), a personal digital assistant, a set-top box, a game console, a digital video recorder, a media center computer, a home automation computer, an appliance computer, etc. for providing functions and user interfaces as described herein. Server 2102 and devices 2104 can be connected via communication network 2106 and/or connections 2108. Communication network 2106 and connections 2108 can be any suitable connections for coupling server 2102 and devices 2104, can be a wired connection, a wireless connection, or a combination of the same, and can include any suitable communication network, such as the Internet, a local area network, a wide area network, a wireless network, a telephone network, a cable network, a satellite network, etc. Server 2102 may communicate with devices 2104 using any suitable protocol, such as the wireless application protocol (WAP), TCP/IP, etc.

In some embodiments, server 2102 may store assets in a database. This database can be any suitable device for storing data, and may be a database, a disk drive, a data structure in memory, etc. The database can be part of or connected to server 2102.

Each of server 2102 and devices 2104 can include one or more processors and one or more interfaces. The processor(s) in each can be any suitable processing devices including microprocessors, digital signal processors, controllers, etc., and may be the same or different within or between server 2102 and devices 2104. The interface(s) in each can be any suitable interface and may use any suitable protocol. The interfaces can correspond to the type of connection(s) used by server 2102 and devices 2104. For example, server 2102 and devices 2104 can each include a wireless interface when connection 2106 is a wireless connection.

The connection between server 2102 and a device 2104 can use narrow-band accessible live video streaming to produce the "live video" in FIG. 1. The stream can be locally buffered at device 2104 to reduce pauses in the presentation due to transmission delays. To preserve a strong audio connection, server 2102 can regularly ping (or otherwise test) devices' 2104 connections and auto-optimizes their settings based on their connection speeds, changing their frame rates as necessary and, for very poor connections, turning video off altogether (but leaving audio on).

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A method for teaching a student in a computer-based learning environment, comprising:

identifying, using at least one processing device, a first concept that was learned by a first student and that is related to a second concept to be learned by the first student;

identifying, using the at least one processing device, a first type of content used to teach the first concept to the first student;

identifying, using the at least one processing device, at least one other student that learned the first concept from the first type of content;

identifying, using the at least one processing device, a second type of content through which the at least one other student learned the second concept;

selecting, using the at least one processing device, content corresponding to the second concept and the second type of content; and presenting, using the at least one processing device, the content corresponding to the second concept and the second type of content to the first student.

2. The method of claim 1, wherein the type of content is at least one of video, audio, text, problem solving, and case study.

3. The method of claim 1, further comprising automatically categorizing content.

4. The method of claim 3, further comprising identifying a categorization for the content based on a comparison of the content to other content.

5. The method of claim 3, further comprising identifying a categorization for content based on a comparison of the content to tags.

6. The method of claim 1, further comprising updating a student learning profile based up an assessment.

7. The method of claim 6, wherein the assessment is an adaptive assessment.

8. The method of claim 7, further comprising selecting a question to be asked in the assessment based upon a previous answer.

9. The method of claim 1, wherein:
at least one of selecting the content and presenting the content are based on at least one of:
the frequency with which content for the first concept was presented to the first student; and
the length of time in a session in which content for the first concept was presented to the first student.

10. The method of claim 1, wherein selecting the content is based on the length of time the first student spends learning with a type of content corresponding to the first content.

11. The method of claim 1, further comprising determining if pre-requisites corresponding to the content have been met by the first student before presenting the content.

12. The method of claim 1, further comprising:
determining a first score associated with the at least one other student learning the second concept from the second type of content; and
comparing the first score with at least one other score associated with learning the second concept.

13. The method of claim 1, wherein the presenting of the content corresponding to the second concept and the second type of content to the first student is a first strategy for teaching the second concept to the first student, the method further comprising:
administering an assessment of how well the first student learned the second concept from the second type of content; and
selecting a second strategy of teaching the second concept to the first student based on the first strategy.

14. A non-transitory computer-readable medium containing computer-executable instructions that, when executed by a processor, causes the processor to perform a method for teaching a student in a computer-based learning environment, the method comprising:
identifying a first concept that was learned by a first student and that is related to a second concept to be learned by the first student;
identifying a first type of content used to teach the first concept to the first student;

identifying at least one other student that learned the first concept from the first type of content;

identifying a second type of content through which the at least one other student learned the second concept;

selecting content corresponding to the second concept and the second type of content; and presenting the content corresponding to the second concept and the second type of content to the first student.

15. The non-transitory computer-readable medium of claim 14, wherein the type of content is at least one of video, audio, text, problem solving, and case study.

16. The non-transitory computer-readable medium of claim 14, wherein the method further comprises automatically categorizing content.

17. The non-transitory computer-readable medium of claim 16, wherein the method further comprises identifying a categorization for the content based on a comparison of the content to other content.

18. The non-transitory computer-readable medium of claim 16, wherein the method further comprises identifying a categorization for content based on a comparison of the content to tags.

19. The non-transitory computer-readable medium of claim 14, wherein the method further comprises updating a student learning profile based up an assessment.

20. The non-transitory computer-readable medium of claim 19, wherein the assessment is an adaptive assessment.

21. The non-transitory computer-readable medium of claim 20, wherein the method further comprises selecting a question to be asked in the assessment based upon a previous answer.

22. The non-transitory computer-readable medium of claim 14, wherein:
at least one of selecting the content and presenting the content are based on at least of:
the frequency with which content for the first concept was presented to the first student; and
the length of time in a session in which content for the first concept was presented to the first student.

23. The non-transitory computer-readable medium of claim 14, wherein selecting the content is based on the length of time the first student spends learning with a type of content corresponding to the first content.

24. The non-transitory computer-readable medium of claim 14, wherein the method further comprises determining if pre-requisites corresponding to the content have been met by the first student before presenting the content.

25. The non-transitory computer-readable medium of claim 14, wherein the method further comprises:
determining a first score associated with the at least one other student learning the second concept from the second type of content; and
comparing the first score with at least one other score associated with learning the second concept.

26. The non-transitory computer-readable medium of claim 14, wherein the presenting of the content corresponding to the second concept and the second type of content to the first student is a first strategy for teaching the second concept to the first student, the method further comprising:
administering an assessment of how well the first student learned the second concept from the second type of content; and
selecting a second strategy of teaching the second concept to the first student based on the first strategy.

27. A system for teaching a student in a computer-based learning environment, comprising:
at least one processor that:
identifies a first concept that was learned by a first student and that is related to a second concept to be learned by the first student;
identifies a first type of content used to teach the first concept to the first student;
identifies at least one other student that learned the first concept from the first type of content;
identifies a second type of content through which the at least one other student learned the second concept;
selects content corresponding to the second concept and the second type of content; and
presents the content corresponding to the second concept and the second type of content to the first student.

28. The system of claim 27, wherein the type of content is at least one of video, audio, text, problem solving, and case study.

29. The system of claim 27, wherein the at least one processor also automatically categorizes content.

30. The system of claim 29, wherein the at least one processor also identifies a categorization for the content based on a comparison of the content to other content.

31. The system of claim 29, wherein the at least one processor also identifies a categorization for content based on a comparison of the content to tags.

32. The system of claim 27, wherein the at least one processor also updates a student learning profile based up an assessment.

33. The system of claim 32, the assessment is an adaptive assessment.

34. The system of claim 33, wherein the at least one processor also selects a question to be asked in the assessment based upon a previous answer.

35. The system of claim 27, wherein:
at least one of selecting the content and presenting the content are based on at least one of:
the frequency with which content for the first concept was presented to the first student; and
the length of time in a session in which content for the first concept was presented to the first student.

36. The system of claim 27, wherein the selecting the content is based on the length of time the first student spends learning with a type of content corresponding to the first content.

37. The system of claim 27, wherein the at least one processor also determines if pre-requisites corresponding to the content have been met by the first student before presenting the content.

38. The system of claim 27, wherein the at least one processor also:
determines a first score associated with the at least one other student learning the second concept from the second type of content; and
compares the first score with at least one other score associated with learning the second concept.

39. The system of claim 27, wherein the presenting of the content corresponding to the second concept and the second type of content to the first student is a first strategy for teaching the second concept to the first student, and wherein the at least one processor also:
administers an assessment of how well the first student learned the second concept from the second type of content; and
selects a second strategy of teaching the second concept to the first student based on the first strategy.

\* \* \* \* \*

UNITED STATES PATENT AND TRADEMARK OFFICE
CERTIFICATE OF CORRECTION

| | | |
|---|---|---|
| PATENT NO. | : 8,672,686 B2 | Page 1 of 1 |
| APPLICATION NO. | : 12/192112 | |
| DATED | : March 18, 2014 | |
| INVENTOR(S) | : Jose Ferreira | |

It is certified that error appears in the above-identified patent and that said Letters Patent is hereby corrected as shown below:

In the Claims

Col. 21, Claim 33, line 30, "the assessment" should be -- wherein the assessment --.

Signed and Sealed this
Third Day of March, 2015

Michelle K. Lee
*Deputy Director of the United States Patent and Trademark Office*